United States Patent [19]

Onimaru et al.

[11] Patent Number: 4,953,672
[45] Date of Patent: Sep. 4, 1990

[54] CONTROL CABLE SYSTEM WITH DEVICE FOR REDUCING VIBRATION

[75] Inventors: Sadahiro Onimaru, Minoo; Fumiyasu Kuratani, Akashi; Hiroyoshi Yoshino, Takarazuka, all of Japan

[73] Assignee: Nippon Cable System, Inc., Takarazuka, Japan

[21] Appl. No.: 331,209

[22] Filed: Mar. 31, 1989

[30] Foreign Application Priority Data

Apr. 28, 1988 [JP] Japan ................. 63-106604
Apr. 28, 1988 [JP] Japan ................. 63-106606

[51] Int. Cl.$^5$ .............................................. F16F 7/10
[52] U.S. Cl. ................................. 188/378; 192/30 V
[58] Field of Search ................. 188/378, 379, 380; 174/42; 74/500.5, 501.5 R; 192/30 V

[56] References Cited

U.S. PATENT DOCUMENTS

| 2,688,047 | 8/1954 | MacIntyre ................. 174/42 |
| 2,714,161 | 7/1955 | Featherstun ................. 188/378 |
| 2,859,836 | 11/1958 | Wiener ................. 188/378 |
| 3,246,073 | 4/1966 | Bouche et al. ................. 174/42 |
| 3,662,084 | 5/1972 | Smrekar ................. 174/42 |
| 3,772,718 | 11/1973 | Williams ................. 174/42 X |
| 3,826,339 | 7/1974 | Brokaw ................. 174/42 X |
| 4,140,868 | 2/1979 | Tuttle ................. 188/380 X |
| 4,266,439 | 5/1981 | Hayashi et al. ................. 188/379 X |
| 4,281,753 | 8/1981 | Takemoto et al. ................. 192/30 V X |
| 4,722,428 | 2/1988 | Nishida ................. 192/30 V |

FOREIGN PATENT DOCUMENTS 58-86919 6/1983 Japan .
61-81826 4/1986 Japan .

Primary Examiner—Douglas C. Butler
Attorney, Agent, or Firm—Armstrong, Nikaido, Marmelstein, Kubovcik & Murray

[57] ABSTRACT

A control cable system with a device for damping vibration comprising a control cable an end of which is connected to a vibration source, a vibration member connected to another end of the control cable and a dynamic damper. The dynamic damper is attached on an element of the control cable and is tuned to have a special frequency characteristic. That is, the tuned damper vibrates when it receives a vibration having a frequency in a range including a plurality of resonance frequencies of the vibration member, and the damper resonates in response to a special resonance frequency in the range.

26 Claims, 29 Drawing Sheets

CONTROL CABLE SYSTEM WITH DEVICE FOR REDUCING VIBRATION

BACKGROUND OF THE INVENTION

The present invention relates to a control cable system with a device for reducing vibration, and more particularly, to the system having a device for reducing vibration of a member which receives vibration from a vibration source through the control cable. Hereinafter, the member is referred to as "vibration member".

One of the causes of noise generating in an automobile is vibration of a motor or engine. In general, an end (both of a terminal means of an inner cable or a casing cap of a conduit) of a control cable (or Bowden cable) for operating the motor or for actuating a meter is connected to a motor or a transmission, another end of the conduit has a casing cap fixed on a dash-panel (a wall parting a cabin from an engine room, such as an instrument panel; the engine room means a room in which a motor is installed) or a floor panel. Further, a terminal means fixed on another end of the inner cable (or core element) of the control cable is connected to a manually-operated pedal, a manually-operated lever, various kinds of meters or indicators, and the like.

Vibration of the motor is transmitted to the dash-panel or the pedal through the control cable. When such members vibrate, the dash-panel generates dull noise due to the membrane oscillation thereof, and the pedals and the like vibrate to generate a rattle noise, so that the passengers feel uncomfortable.

The same problems exist in various type of construction machineries in which hydraulic motors are driven by a motor so as to intermittently drive various type of hydraulic actuators.

As a means to prevent the above-mentioned vibration and noise caused by the vibration, Japanese Unexamined Patent Publication No. 81826/1986 (hereinafter referred to "the first prior art I" and Japanese Unexamined Utility Model Publication No. 86915/1983 (hereinafter referred to as "the second prior art II") propose some systems having a device for reducing vibration.

The first prior art I shows a device for reducing the vibration in a clutch-control-system. In the system, as shown in FIGS. 41 and 42, a dynamic damper 105 having a weight and an elastic member is fixed on a movable member, e.g. a release arm 103 or a connecting part thereof, in the clutch-control-system.

The second prior art II shows also a device for reducing the vibration in a clutch-control-system. In the device, as shown in FIG. 43, a boss 122 fixed on the dash-panel 116 and a conduit 106 of the control cable are not directly connected with each other, but an elastic member 124 of a dynamic damper 132 is inserted between the boss 122 and a casing cap of the conduit 106, and therefore, the boss 122 and the conduit 106 are connected with each other through the elastic member 124.

However, in the first prior art I, the release arm 103 vibrates in a three dimensional manner (and has six digrees of freedom). Therefore, directions of vibration must be measured and a suitable posture of the dynamic damper must be previously determined before the attachment thereof.

Further, in the second prior art II, since the elastic member is inserted between the dash-panel and the conduit, the elastic member expands and contracts at every clutch operation, and the stroke-loss is large.

The object of the present invention is to provide a control cable system with a device for reducing vibration, which has a simple construction and good vibration-reducing effect and which does not produce large stroke-loss in the control cable.

SUMMARY OF THE INVENTION

In accordance with the present invention, there is provided a control cable system with a device for reducing a vibration in the control cable system, comprising (a) a control cable for transmitting a mechanical displacement, which has an end directly or indirectly connected to a vibration source, (b) a vibration member which is situated on another end or on a middle portion of the control cable, and which resonates due to a vibration from the control cable, and (c) a dynamic damper attached on an element of the control cable. The dynamic damper has such vibration characteristic that the damper vibrates when the damper receives a vibration having a frequency in a range including a plurality of resonance frequencies of the vibration member, and the damper resonates in response to a special resonance frequency in the range.

Further, in a preferable embodiment, two or more dynamic dampers are attached on the element of the control cable, and resonance frequencies of the dampers are different from each other.

In the control cable system of the present invention, when vibration from the vibration source is applied to the control cable, the dynamic damper moves with a frequency near a resonance frequency so as to negate the vibration of control cable, and reduces the vibration of the control cable at the special frequency. Therefore, the vibration of the vibration member which is connected with the control cable will be effectively and sufficiently reduced.

Also, since the vibrations are transmitted along the axial direction of the control cable, the posture of the dynamic damper of the present invention can be easily determined without measurement of the direction vibration.

Further, in the present invention, since the dynamic damper is not directly inserted in a route transmitting the operational force, but added on the side of the route, the stroke-loss of the control cable is not enlarged.

When the dynamic damper is made in a cylindrical form having a center hole and is deformable in an axial direction thereof, the damper can be easily attached on the control cable.

Hereinafter, some embodiments of the control cable system of the present invention are explained with reference to the accompanying drawings

DETAILED DESCRIPTION

The fundamental system of the present invention is described hereinafter, referring to FIG. 1.

The control cable system in the first aspect of the present invention is a system wherein an end of a control cable which is provided for transmitting a mechanical displacement is directly or indirectly connected with a vibration source, and a vibration member which is sympathetically vibrated by vibration applied from the control cable is situated on a middle portion or another end of the control cable. Further, in the system, a dynamic damper is provided on one of elements of the control cable.

Figure 1:
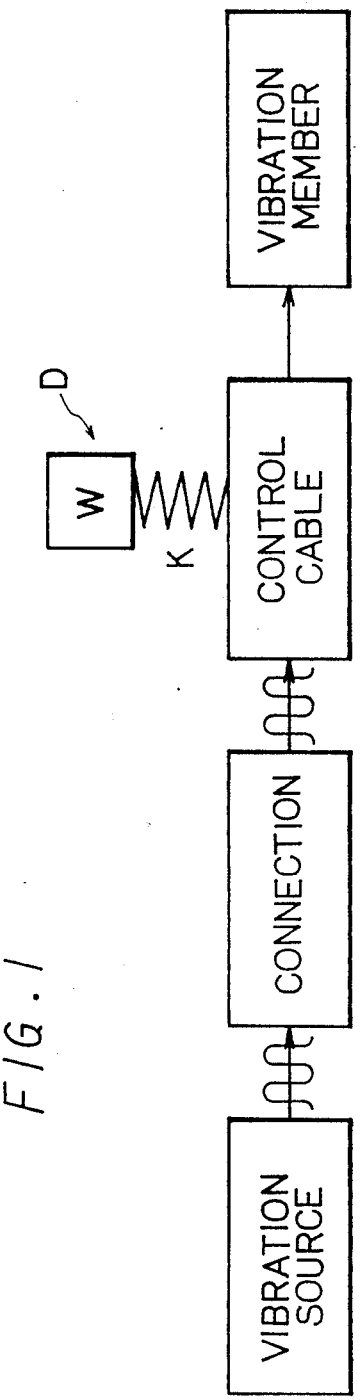
FIG. 1 is a block diagram of an embodiment of the system of the present invention.

The dynamic damper in the system of FIG. 1 has a special feature that the damper comprises an elastic member or elastic members. For example, a rubber body alone, a spring alone, or combination of a rubber body and a spring are included as the elastic member.

In general, a dynamic damper is a combination of a spring member and a weight member as a physical form (the dynamic damper of the first and second prior arts are so). However, in the system shown in FIG. 1, as a good idea, the self weight of the elastic member is used as a weight component.

When the damper is made of a rubber body, the damper can be easily attached to the element of the control cable, since the construction of the damper is simple and small.

Further, since the characteristic frequency of the damper can be easily changed by scraping the rubber body to reduce the weight and rigidity thereof, the damper can be easily tuned to accord to the resonance frequency of the vibration member.

Next, referring to FIG. 2, the second aspect of the present invention is described hereinafter.

In the control cable system of the second aspect of the present invention, two or more dynamic dampers are attached to one of elements of the control cable, and each dynamic damper has a vibration characteristic or frequency characteristic where the dynamic damper becomes to vibrate and resonates when the damper is vibrated with a frequency in the frequency range including a number of resonance (sympathetic) frequencies, and further, the dampers have respective resonance frequencies different from each other.

Figure 2:
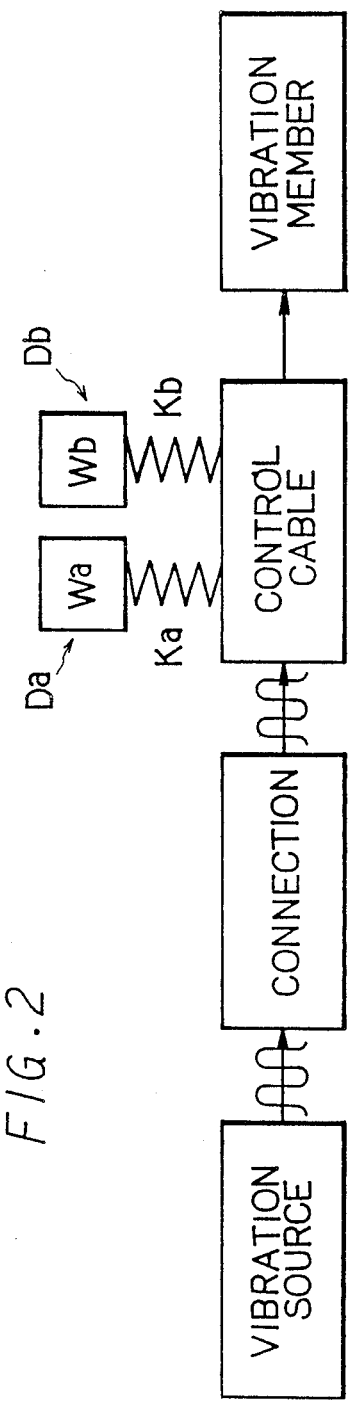
FIG. 2 is a block diagram of another embodiment of the system of the present invention.

In the control cable system shown in FIG. 2, when a vibration from the vibration source is applied to the control cable, each of two dynamic dampers Da, Db moves to negate the vibration of the control cable at a vibration frequency near the respective resonance frequency, and reduces the vibration of the control cable. Therefore, the vibration of the vibration member connected with the control cable is also reduced.

Figure 3:
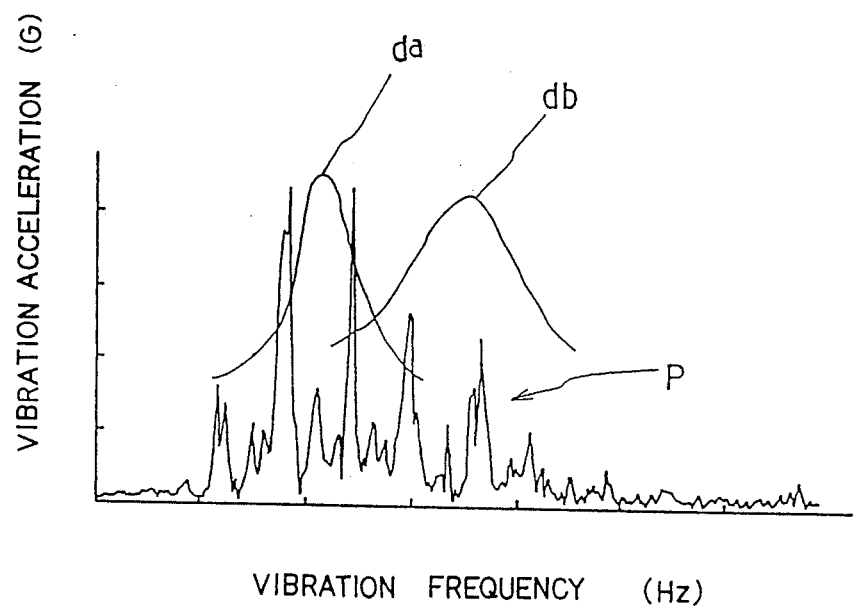
FIG. 3 is a graph conceptionally illustrating the isolating effect of the system of the embodiment of FIG. 2.

In the second aspect of the present invention, since two or more dynamic dampers are used, the frequency range where the vibration is reduced is wide. Referring to FIG. 3, the conceptional function is explained. In FIG. 3, the X-axis shows the frequency (Hz), and the Y-axis shows the vibrational acceleration (G). The mark P is a vibrational spectrum, and when a vibration source has many exiting frequencies, the sectrum P has many vibrational peaks at the area near the resonance frequencies of the vibration member, as shown in FIG. 3. The unit "G" means gravity acceleration, i.e. 1G=9.81 m/sec$^2$.

The marks da and db denote the vibrational spectra of the dynamic dampers Da and Db, respectively. The masses wa, wb and spring constants ka, kb are determined so that resonance frequencies thereof are different from each other. Thus, when the control cable receives a vibration with a wide range of frequencies, each dynamic damper Da, Db vibrates with a frequency near the resonance frequencies thereof (peaks in FIG. 3) reduces the vibration of the vibration member in the inherent range of itself. Therefore, the vibration of the vibration member can be reduced with a wide range of frequency.

Hereinafter, the above-mentioned two types of systems are explained with more concrete embodiments.

(I) A control cable system to which the present invention is applied:

The present invention is applied to a system wherein vibration of a vibration source is transmitted through a control cable and vibrates a vibration member to which the control cable is connected. As a typical example of such a system, there can be exemplified an operating system or an instrument actuating system of an automobile or a construction equipment.

Figure 4:
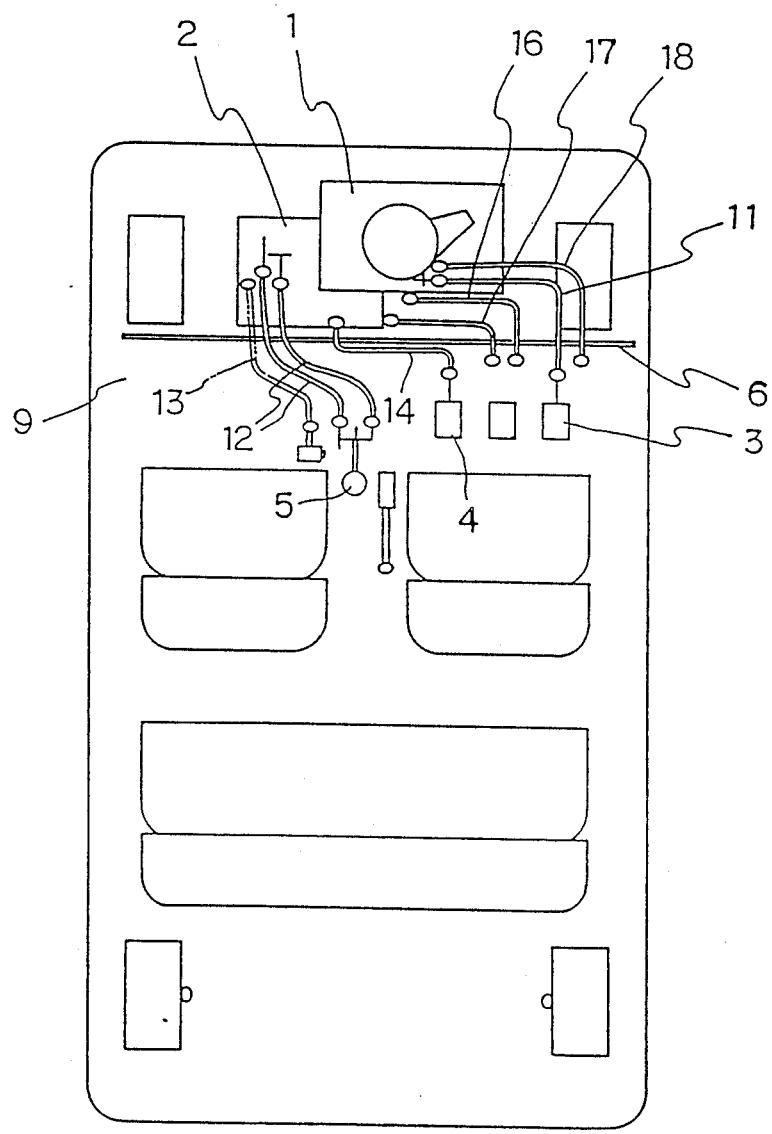
FIG. 4 is a schematic plan view of an automobile in which various control cable systems of the present invention are used.

An embodiment of the present invention is explained in conjection with FIG. 4 in which the numeral 1 is a motor of an automobile, the numeral 2 is a transmission, the numeral 3 is an accelerator pedal, the numeral 4 is a clutch pedal and the numeral 5 is a shift lever for a speed changing operation. As an operating system in a suchlike automobile to which the present invention can be applied, there is exemplified an accelerating cable 11, an operating cable 12 for a manual transmission, an operating cable 13 for an automatic transmission, a clutch cable 14, a choke (throttle) cable 18 or the like. And as an instrument actuating system, there is exemplified a speedmeter actuating cable 16, a tachometer actuating cable 17 or the like.

Each of these cables is connected directly or indirectly to the motor 1 which is a vibration source. A casing cap at an end of a conduit of the cable is fixed to an instrument panel 6 or a floor panel 9 and an end of an inner cable is connected to one of pedals, levers or instruments. The instrument panel 6, the floor panel 9, each of the pedals or each of the instruments corresponds to the above-mentioned vibration member which receives vibration from motor 1 though the control cable.

Further, also in a construction equipment or a construction machinery, the present invention can be applied to the systems similar to those being exemplified in the foregoing automobile, and floor thereof, an operating lever or the like corresponds the vibration member.

(II) Mounting positions of dynamic dampers

In the present invention, the dynamic dampers can be mounted on any components, parts or elements of a control cable.

That is, a conduit of a control cable, a casing cap at an end of the conduit, an inner cable of the control cable and an end fitting for the inner cable can be selected as mounting positions.

Figure 5:
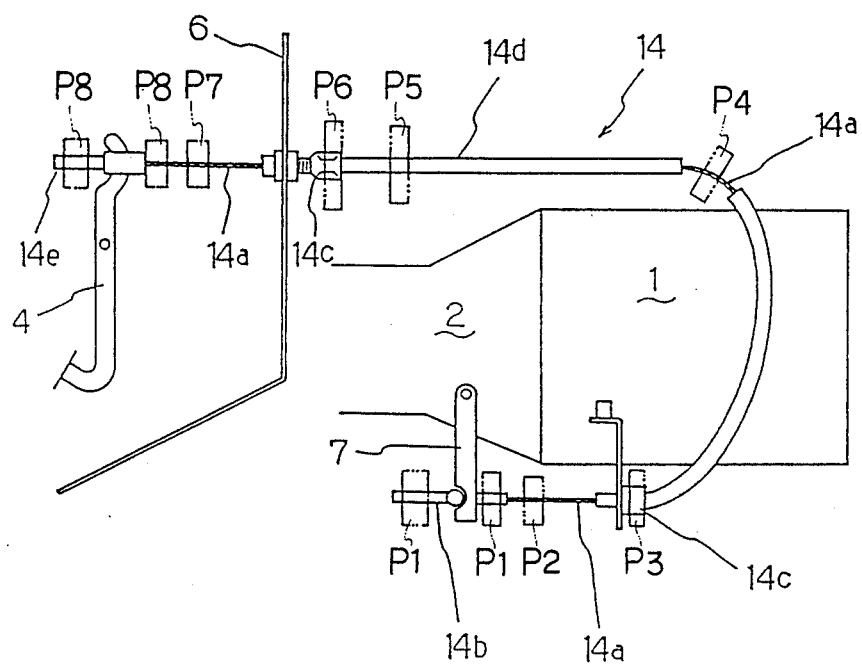
FIGS. 5 and 6 are schematic elevational views showing examples of position on which the dynamic damper is attached.
Figure 6:
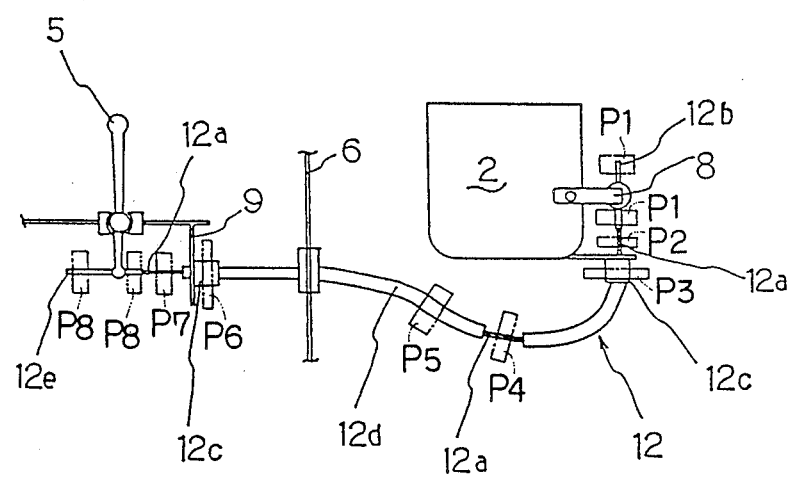

Next, the mounting position is explained concretely in conjunction with FIG. 5 and FIG. 6. In these examples, the mounting positions are as follows.

(a) Position P1: an end fitting (or a means to be connected to an inner cable) on the side close to a vibration source.

(b) Position P2: an exposed part of the inner cable on the side close to a vibration source.

(c) Position P3: a casing cap on the side close to a vibration source.

(d) Position P4: the middle part of the inner cable.

(e) Position P5: the conduit.

(f) Position P6: a casing cap on the side close to a vibration member.

(g) Position P7: an exposed part of the inner cable on the side close to a vibration member.

(h) Position P8: an end fitting on the side close to a vibration member.

FIG. 5 shows an example in which the present invention is applied to a clutch cable 14, and the mounting positions P1 through P8 in this example are as follows.

P1: an end fitting 14b of an inner cable 14a close to a release arm 7 of a clutch.

P2: a part of the inner cable 14a close to the release arm 7.

P3: a casing cap 14c close to the release arm 7.

P4: the middle part of the inner cable 14a.

P5 a conduit 14d.

In this connection, in case of the conduit, it is preferable to mount at a position closer to a vibration member than a position where a configuration of a control cable arrangement is curved and the inner cable 14a in the conduit 14d strongly contacts with the inside wall of the conduit 14d with vibration being transmitted from the inner cable 14a to the conduit 14d.

Further, in case of the conduit, mounting operation can be carried out satisfactory in such a manner that a covering layer made of synthetic resin put on the outer periphery of the conduit 14d is removed and a dynamic damper is in contact with the conduits 14d directly.

P6: a casing cap 14c close to a pedal 4.

P7: a part of the inner cable 14a close to the pedal 4.

P8 an end fitting 14e close to the pedal 4.

FIG. 6 shows an example in which the present invention is applied to an operating cable 12 for a manual transmission, and the mounting positions P1 through P8 in this example are as follows.

P1: an end fitting 12b close to a lever 8 of a transmission 2

P2: a part of an inner cable 12a close to the lever 8.

P3: a casing cap 12c close to the lever 8.

P4: the middle part of the inner cable 12a.

P5: a conduit 12d.

Also in this case, it is preferable to mount the dynamic damper at a position close to a floor panel 9, where the conduit is vibrated due to the vibration from the inner cable.

P6: a casing cap 12c close to an operating lever 5.

P7: a part of the inner cable 12a close to the operating lever 5.

Although example mounting positions are as explained hereinbefore, the mounting positions P1 through P8 can be selected optionally in each of the examples shown in FIG. 5 and FIG. 6.

In other control cable than the above mentioned cables 12, 14, similar mounting positions can also be selected.

A preferred number of mounted dynamic dampers is one per one control cable system in accordance with the first aspect of the present invention.

On the other hand, two or more dynamic dampers can be mounted in accordance with the second aspect of the present invention. Further, two or more dynamic dampers may be mounted at one position in an adjoining or adjacent relationship, and each of the mounting positions P1 through P8 may be employed independently and optionally.

(III) The structure of the dynamic damper:

As the damper in the present invention, there can be used any damper which has functions of a mass component and a spring component. Accordingly the following combinations can be employed.

(1) A weight and an elastic body

The weight serves as a mass component and the elastic body serves as a spring component.

(2) An elastic body only

Weight of the elastic body serves as a mass component.

(3) A weight and a spring (4) A spring only

Weight of the spring serves as a mass component (5) A weight, an elastic body and a spring The dynamic damper (hereinafter called "damper") in the first aspect of the present invention is preferably composed solely of elastic members (the above types (2) and (4)) and the weight of the elastic members serves as a mass component. However, a separate weight member can be employed together with the elastic member.

As the material of the elastic member used in the damper of the present invention, there can be used a molded body comprising rubber such as natural rubber or synthetic rubber such as chloroprene rubber, butyl rubber, nitrile rubber and the like; and synthetic material comprising various plastics (sythesized resin) such as polyurethane, polyvinylchloride and the like. Further, a spring can be used as the elastic member. As the material properly, there can be used any material for example, ferrous metal such as steel and stainless steel; non-ferrous metal such as copper and aluminum; plastic such as polyacetal and polycarbonate; composite material such as FRP.

Next there is explained each embodiment of the damper without weight member used in the present invention in conjunction with the drawings.

Figure 7:
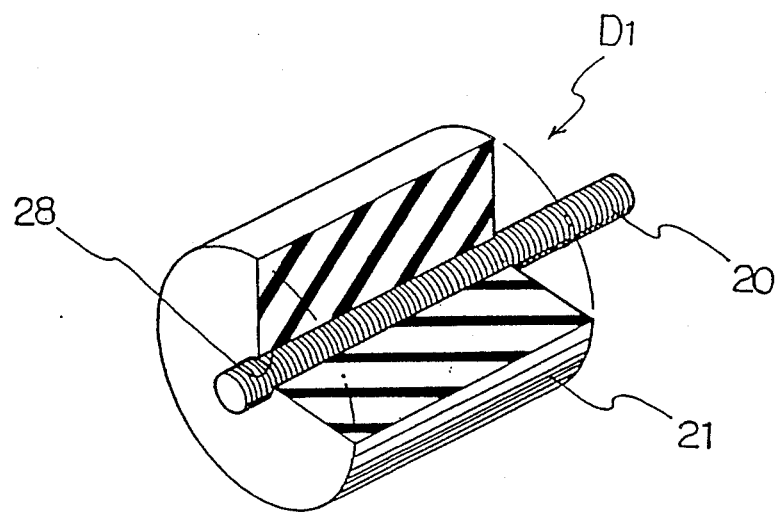
FIGS. 7 to 12 are perspective views showing embodiments of the dynamic damper without weight member in the present invention, respectively.

Damper D1 (FIG. 7):

A cylindrical column 21 made of rubber or plastics is used as the elastic member in the damper D1 as illustrated in FIG. 7. A hole 28 is provided at the center of the cylindrical column 21 to allow a member 20, such as a rod, or a conduit, at the mounting position to be inserted and fixed.

Figure 8:
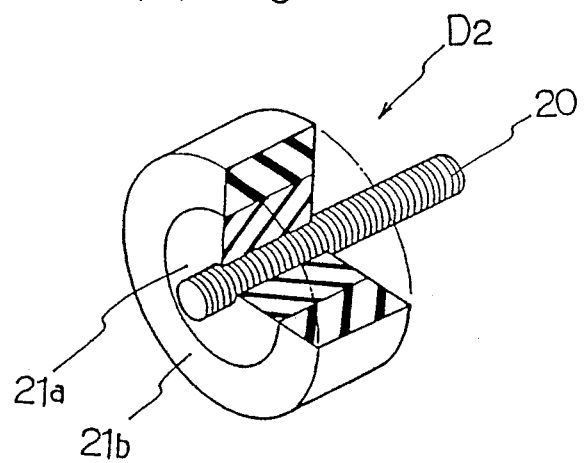

Damper D2 (FIG. 8):

A cylindrical tube 21b is connected to the outer periphery of a cylindrical column 21a as illustrated in FIG. 8. Both the cylindrical column 21a and the cylindrical tube 21b are the elastic members made of rubber or plastics.

In addition, it is possible that the cylindrical column 21a and the cylindrical tube 21b are allowed to have two resonance (synpathetic) frequencies by changing the weight and the rigidity of each of them.

Figure 9:
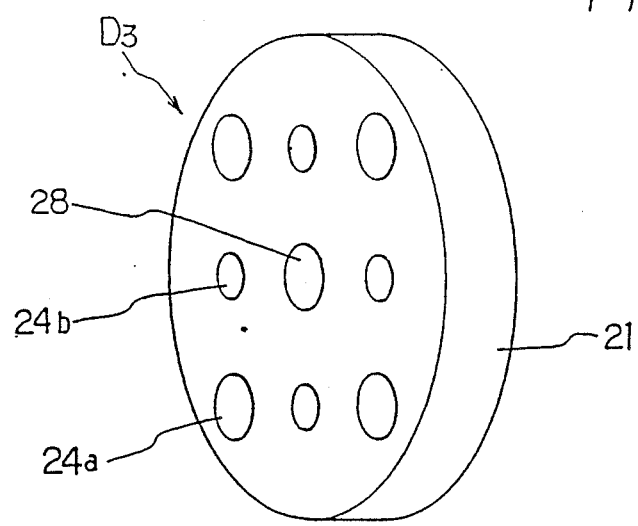

Damper D3 (FIG. 9):

A thick disk 21 made of rubber or plastics is used as an elastic member as illustrated in FIG. 9. A center hole 28 for mounting is provided at the center of the thick disk 21 and four holes 24a having a large diameter and another four holes 24b having a small diameter are provided around the above-mentioned hole 28. The disk 21 itself has a plural of resonance frequencies.

Figure 10:
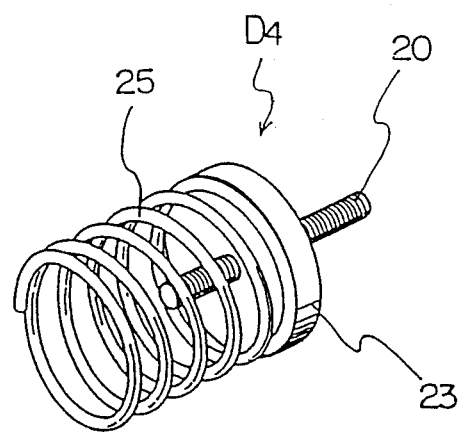

Damper D4 (FIG. 10):

The damper D4 utilizes a spring as the elastic member as illustrated in FIG. 10. A mounting plate 23 made of steel is engaged by means of screwing to a member 20 at the mounting position, and a coil spring 25 is fixed to the mounting plate 23.

Figure 11:
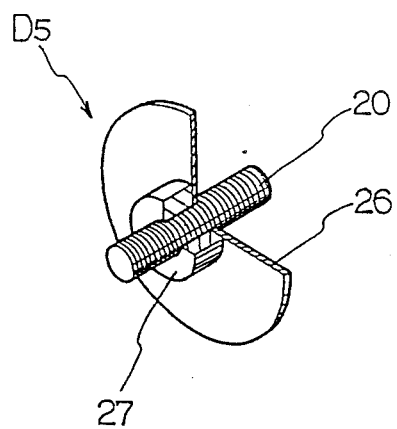

Damper D5 (FIG. 11):

A leaf spring 26 made of a thin disk-like metal sheet is fixed to a boss 27 which is engaged by means of screwing to a member 20 at the mounting position as illustrated in FIG. 11.

Figure 12:
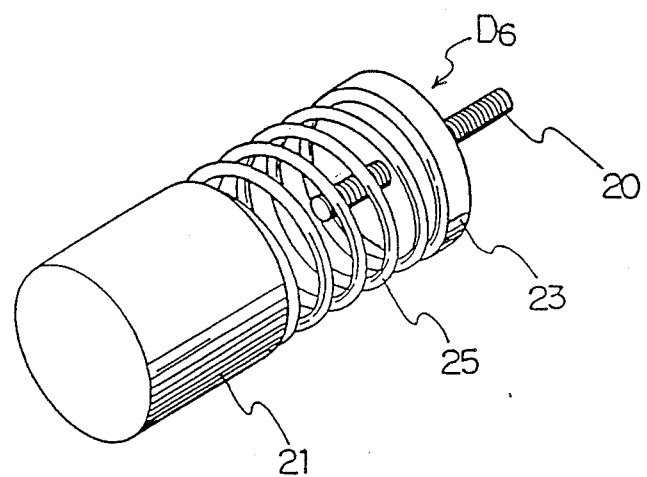

Damper D6 (FIG. 12):

The damper D6 shown in FIG. 12 utilizes a cylindrical column 21 made of rubber and a spring 25 as an elastic member. In the damper D6 illustrated in the drawing, the coil spring 25 is fixed via a mounting plate 23 to a member 20 at the mounting position, and the cylindrical column 21 made of rubber is fixed to the end of the coil spring 25. However, the member 20 at the mounting position can be inserted into the cylindrical column 21 made of rubber, and the coil spring 25 can be fixed to the cylindrical column 21. It is possible that the cylindrical column 21 and the spring 25 are allowed to have two resonance points by changing the resonance frequencies of each of them.

Although various embodiments of the damper are as explained hereinbefore, the damper is not limited to those embodiments and any damper composed solely of elastic members can be used as a no-weight dynamic damper in the present invention.

Next, there are explained hereinafter embodiments of the damper having a weight member used in the present invention in conjunction with the drawings.

Figure 13:
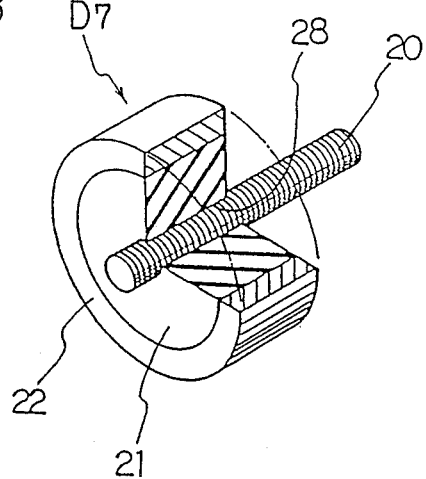
FIGS. 13 to 19 are perspective views showing embodiments of the dynamic damper having a weight member in the present invention.

Damper D7 (FIG. 13):

In FIG. 13, the numeral 21 is an elastic body having a shape like a thick disk and being made of rubber or the like, and the numeral 22 is a weight having a shape like a ring. The elastic body 21 and the weight 22 are connected by employing any method, for example, by bonding a rubber to a metal. A hole 28 for mounting is provided at the center of the elastic body. The numeral 20 is a member at the mounting position, which is inserted into the hole 28 and fixed by means of bonding, adhering or the like.

Figure 14:
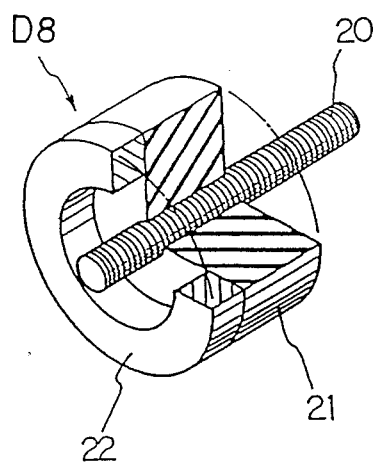

Damper D8 (FIG. 14):

The damper D8 has a construction wherein a weight 22 having a shape like a ring is connected to the side surface of an elastic body 21 as illustrated in FIG. 14.

Figure 15:
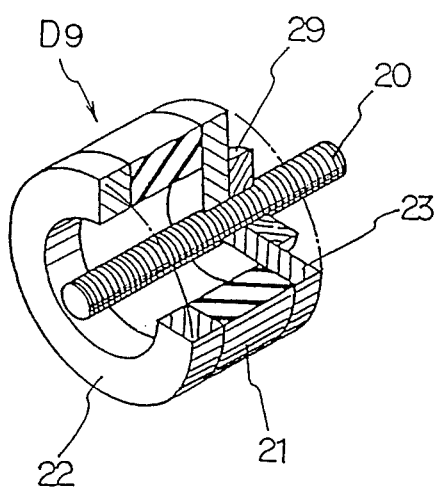

Damper D9 (FIG. 15):

A disk 23 made of steel is engaged by means of screwing to a member 20 at the mounting position, and an elastic body 21 having a shape like a ring and a weight 22 are connected in this order to the disk 23 as illustrated in FIG. 15. The numeral 29 is a nut for tightening the disk 23. By the way, if the weight 22 is removed, the construction becomes to the same as that of damper D4 of FIG. 10.

Figure 16:
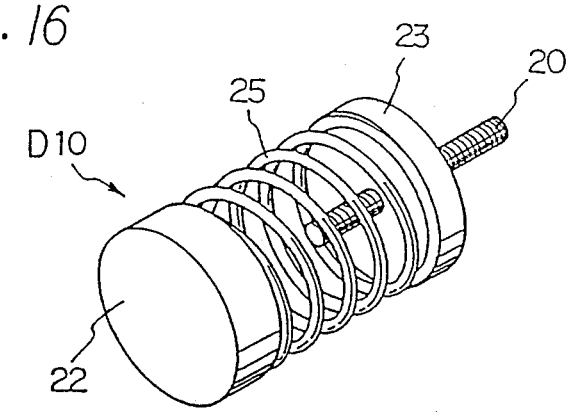

Damper D10 (FIG. 16):

A disk 23 made of steel is engaged by means of screwing to a member 20 at the mounting position, a spring 25 having a shape like a coil is fixed at the disk 23, and a weight 22 is connected to a free end of the spring 25 as illustrated in FIG. 16.

Figure 17:
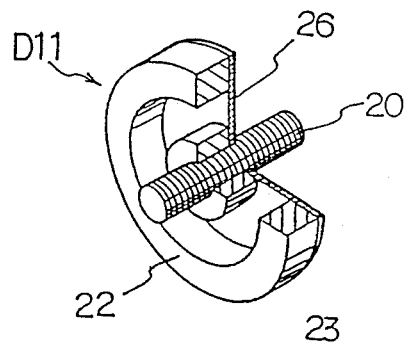

Damper D11 (FIG. 17):

A leaf spring 26 made of a thin metal sheet is engaged by means of screwing to a member 20 at the mounting position, and a weight 22 having a shape like a ring is fixed to the periphery of the leaf spring 26. By the way, if the weight 22 is removed, a construction becomes to the same as that of the damper D5 of FIG. 11.

Figure 18:
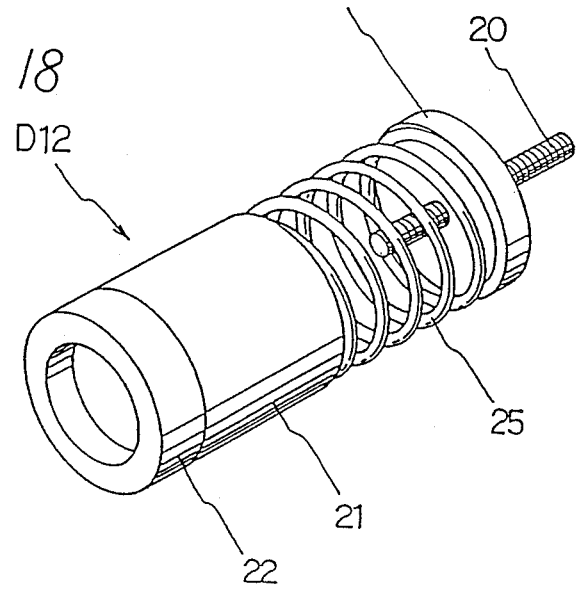

Damper D12 (FIG. 18):

As shown in FIG. 18, the damper D12 has a construction wherein an elastic body 21 is fixed to a position between the spring 25 and the weight 22 in the damper D10 of FIG. 16.

Figure 19:
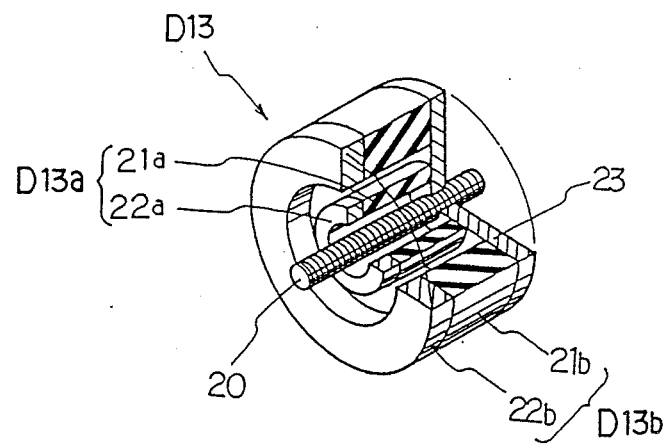

Damper D13 (FIG. 19):

The damper D13a comprising an elastic body 21a and a weight 22a is fixed to the side surface of a disk 23 near the center thereof and the damper D13b comprising an elastic body 21b and a weight 22b is fixed to the side surface of the disk 23 near the outer periphery thereof. That is to say, the damper D13 is a combination of two dampers D13a and D13b. This embodiment also is designed to have different resonance points with respect to the dampers D13a and D13b.

Figure 20:
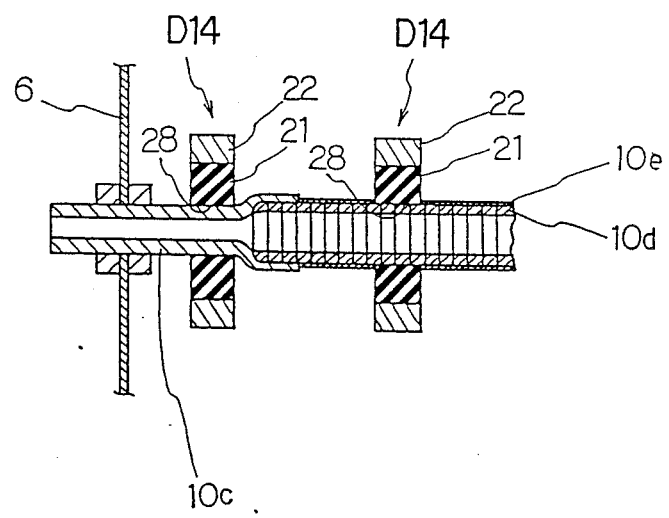
FIGS. 20 and 21 are longitudinal sectional views showing embodiments of a manner of attaching the dynamic damper.

Damper D14 (FIG. 20):

A weight 22 having a shape like a ring is fixed to the outer periphery of an elastic body 21 having a shape like a thick disk as illustrated in FIG. 20. A hole 28 having a relatively large diameter is provided at the center of the elastic body 21. This damper D14 is a type of damper which can be directly mounted on a conduit 10d or a casing cap 10c.

Figure 21:
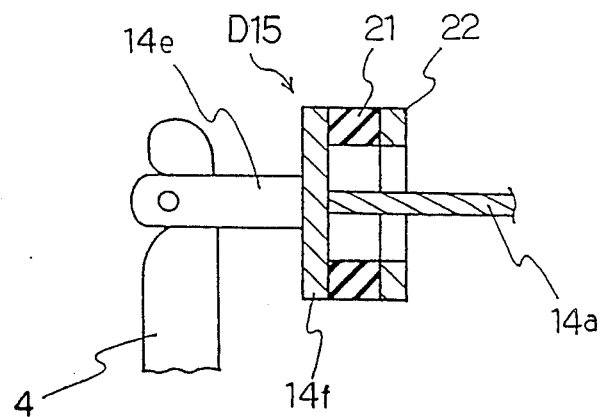
Figure 22:
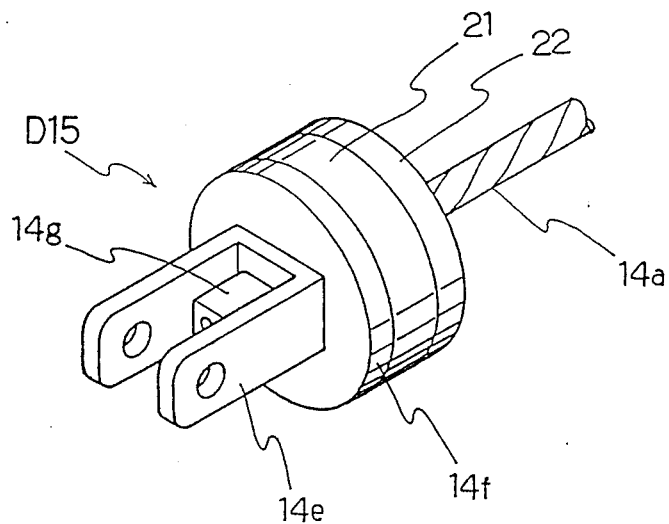
FIG. 22 is a perspective view of the dynamic damper shown in FIG. 21.

Damper D15 (FIGS. 21 and 22):

The damper D15 shown in FIG. 21 and FIG. 22 is mounted on an end fitting 14e at any pedal such as an accelerator pedal. An inner cable 14a is fixed to the end fitting 14e by means of a nipple 14g. The damper D15 wherein an elastic body 21 and a weight 22 are connected in this order is mounted to an end plate 14f of the end fitting 14e.

Although various constructions of the damper having a weight member are explained hereinbefore, the damper is not limited to those embodiments and any damper having any shape and any construction can be used as far as the damper has a spring component and a mass component.

(IV) Vibration test (1)

With respect to the control cable system of the first aspect of the present invention, a vibration test was carried out in accordance with the following procedure.

(a) Damper:

The damper D1 shown in FIG. 7, the damper D3 shown in FIG. 9 and the damper D4 shown in FIG. 10 were subjected to the vibration test.

With respect to the specification of the damper D1, the outside diameter of the cylindrical column (21) is 50 mm, the length thereof is 50 mm, the weight is 142.7 g and the material is chloroprene rubber (hardness: JIS K 6301: Hs 60 (JIS A)). The vibration spectrum thereof is shown in FIG. 23, a resonance point exists at 348.75 Hz and the vibration acceleration of the output corresponding to the input of 1 G at the resonance is 7 G.

Figure 24:
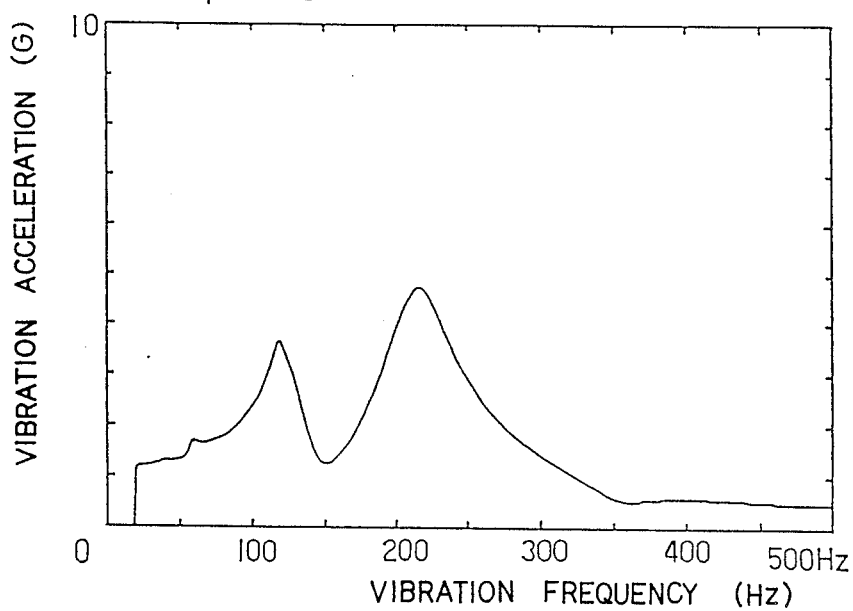

With respect to the damper D3, the outside diameter is 50 mm, the thickness is 10 mm, the inside diameter of the hole 28 is 5 mm, the inside diameter of the hole 24a is 6 mm, the inside diameter of the hole 24b is 4 mm, the material is chloroprene rubber (hardness: JIS K 6301: Hs 60 (JIS A)) and the weight is 25.22 g. The vibration spectrum thereof is shown in FIG. 24 and two resonance points exist at 120.00 Hz and 216.25 Hz. The vibration accelerations of the output corresponding to the input of 1 G at the above-mentioned resonances are 3.8 G and 4.8 G respectively.

With respect to the damper D4, the free length of the spring 25 is 100 mm, the outside diameter of the coil is 35 mm, the wire diameter is 5 mm, number of turns is 6, the material is hard drawn steel wire SW-C (JIS-G3521), the weight is 150.05 g and the spring constant is 6 Kgf/mm. The vibration spectrum in shown is FIG. 25, a resonance frequency exists at 170.00 Hz and the vibration acceleration corresponding to the input of 1 G at the resonance is not less than 100 G.

Figure 23:
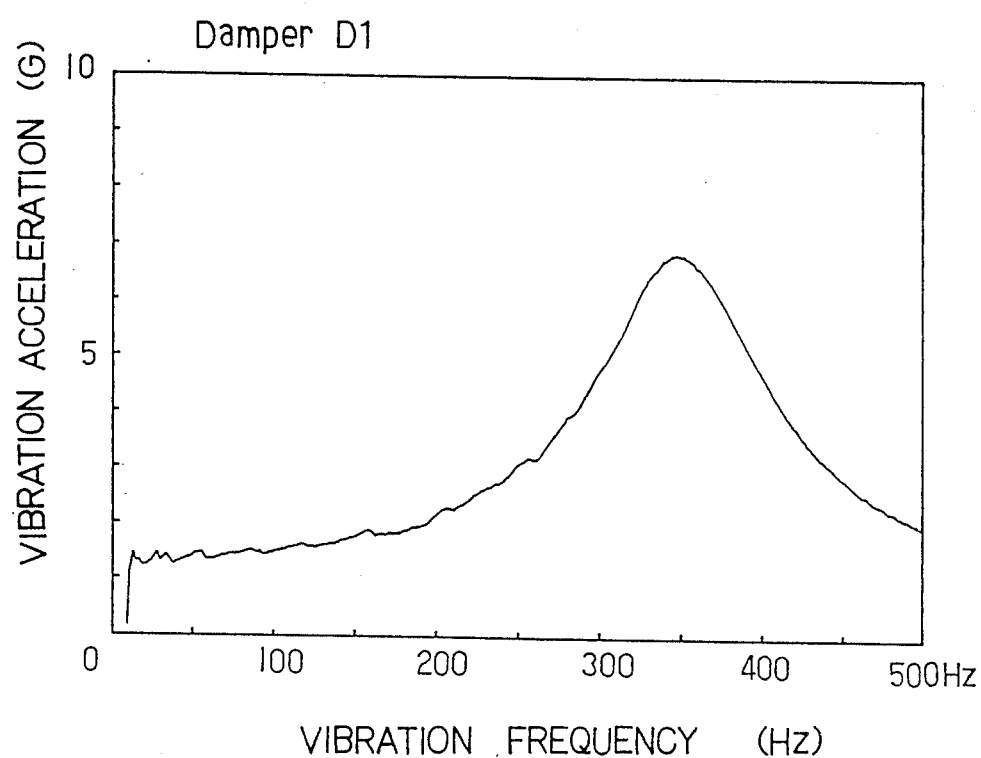
FIGS. 23 to 25 are vibrational spectra of the dynamic dampers D1, D3 and D4, respectively.
Figure 25:
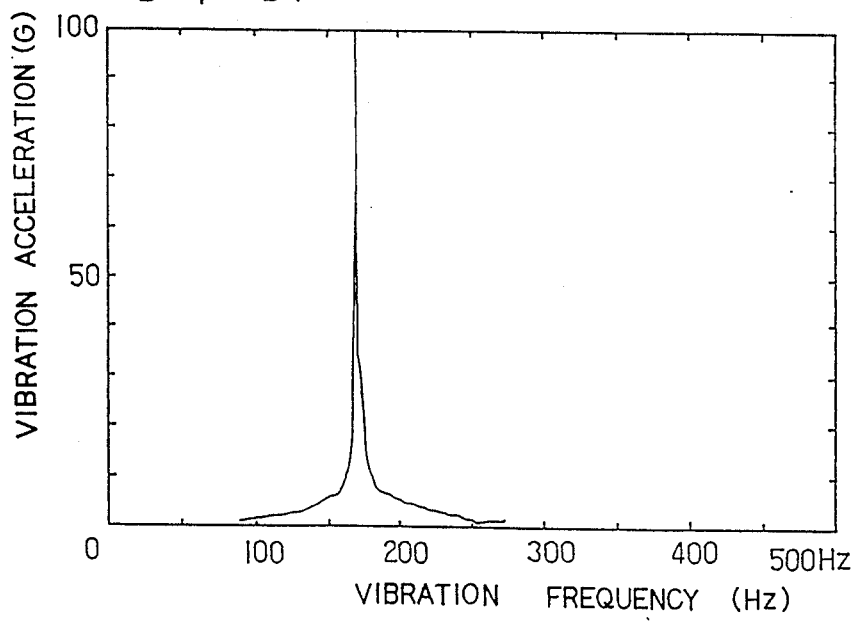
Figure 28B:
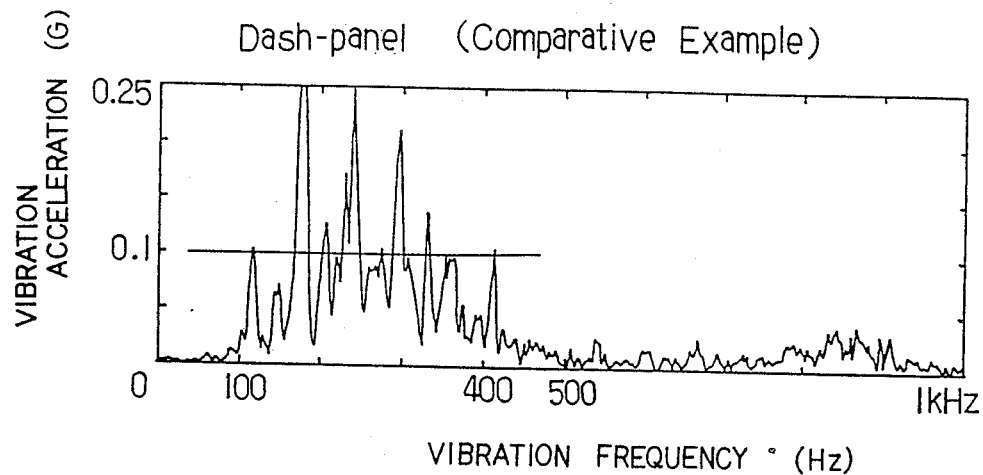
FIGS. 28A and 28B are vibrational spectrum graphs of a Comparative Example of a control cable system.

By comparing FIGS. 23 to 25 with FIG. 28B, it is appear that the dampers D1, D3, D4 has resonance frequencies in a range from 100 Hz to 400 Hz which includes the resonance frequencies of the vibration member, i.e. the dash-panel 6.

Figure 26:
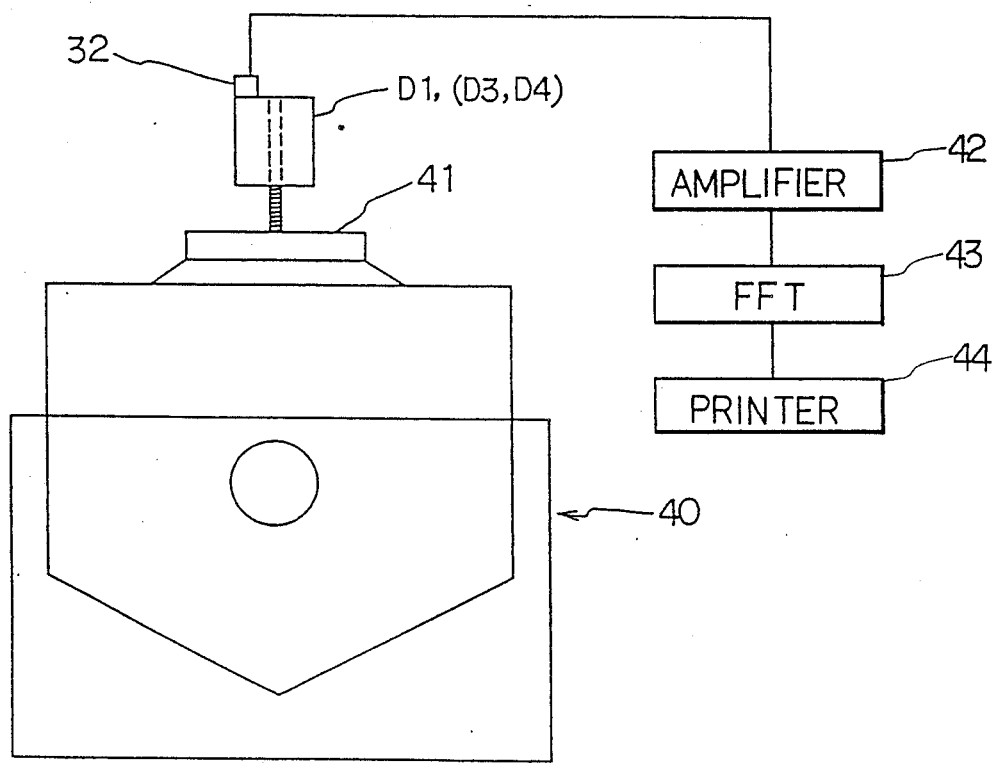
FIG. 26 is a schematic illustrative view of a device for measuring the vibrational spectrum of the dynamic damper.

Each vibration spectrum of the dampers D1, D3, D4 is measured in accordance with the following procedure. As illustrated in FIG. 26, a vibration testing apparatus 40 (Model: VS-3203, available from IMV Kabushiki Kaisha) is used and each of the dampers D1, D3, D4 is mounted separately to each of the vibrators 41 respectively. Each of the dampers D1, D3, d4 is fitted with an accelerator pickup 32 (Model: PV-90A, available from RION Kabushiki Kaisha), then an amplifier 42 (Model: UV-01, available from RION Kabushiki Kaisha), an FFT analyzer 43 (Model: CF-920, available from Kabushiki Kaisha Ono sokki) and a printer 44 (Model: CX-337, available from Kabushiki Kaisha Ono Sokki) are connected to the pickup 32. Vibration having a constant sine curve at vibration acceleration of 1 G is given as an input at a velocity which allows sweeping from 20 Hz to 520 Hz to be carried out in 10 minutes, and a resonance wave form is drawn.

Figure 27:
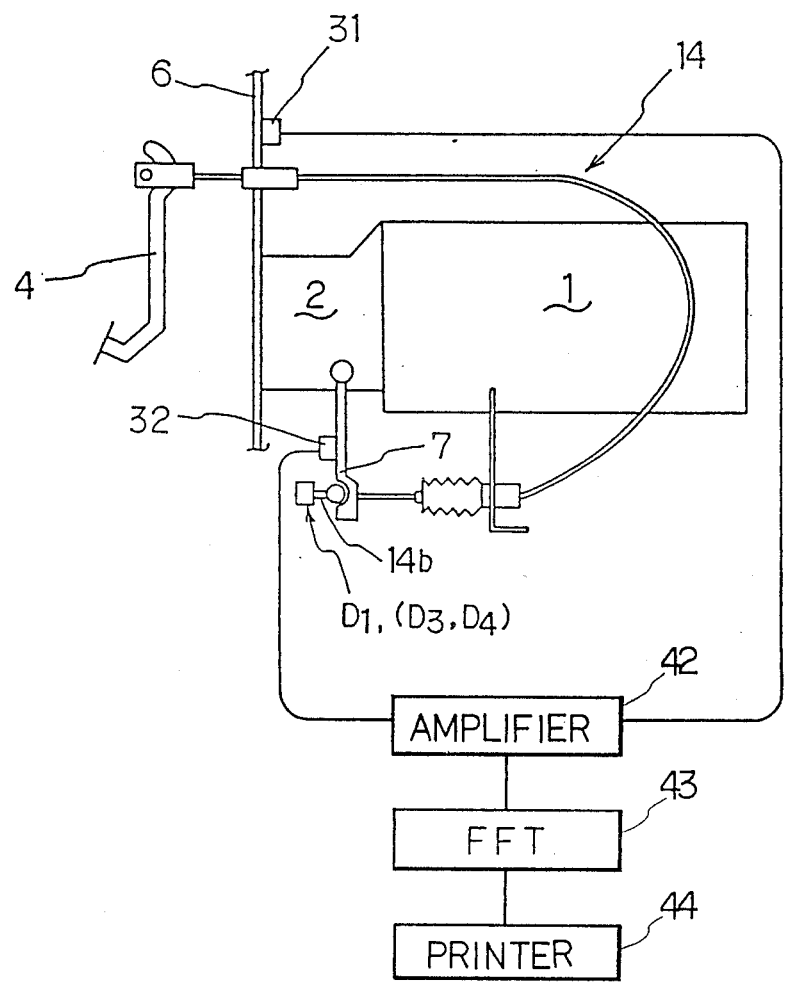
FIG. 27 is a illustrative view showing a method of the vibration test.

(b) Vibration testing apparatus:

An acceleration pickup 31 is mounted to an instrument panel 6 and another acceleration pickup 32 is mounted to a release lever 7 of a clutch as illustrated in FIG. 27. An amplifier 42, an FFT analyzer 43 and a printer 44 are connected to each of the pickups 31, 32. Each mounting position of the dampers D1, D3, D4 is an end fitting 14b on the release lever 7 side of a clutch cable 14.

A vehicle used for the experiment is Suzuki Jimny 1300, 1986 type, Model: E-JA51W. With respect to a pickup 31 on the panel side, there is used Model: PV-85B available from RION Kabushiki Kaisha and with respect to a pickup 32, an amplifier 42, an FFT analyzer 43 and printer 44, the same measuring devices as those used in FIG. 26 are used.

(c) Measuring method:

A motor 1 of the vehicle for the experiment is operated at a specified revolution, pressing and releasing of a clutch pedal 4 are repeated and at the time when confined sound is generated from the dash-panel the vibration is detected for the subsequent frequency analysis. The condition of experiment is indicated in Table 1.

TABLE 1

Figure 28A:
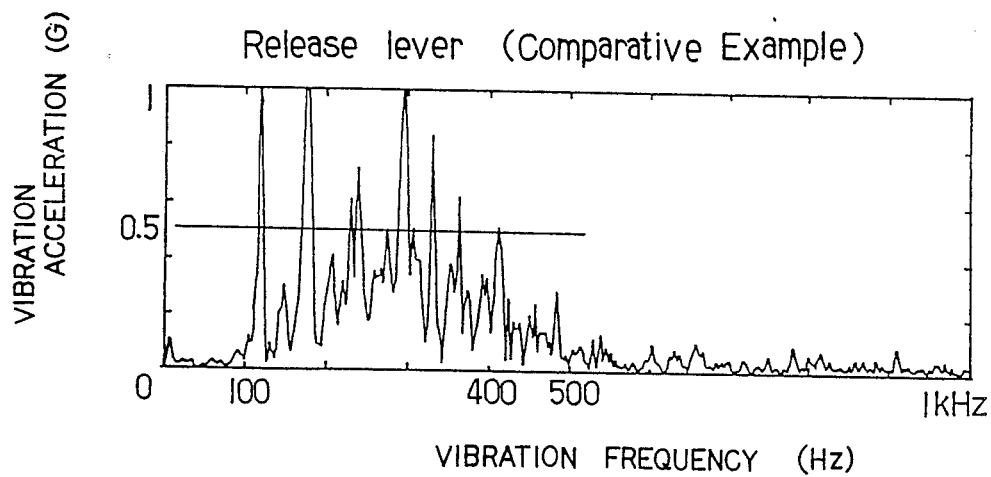
Figure 29B:
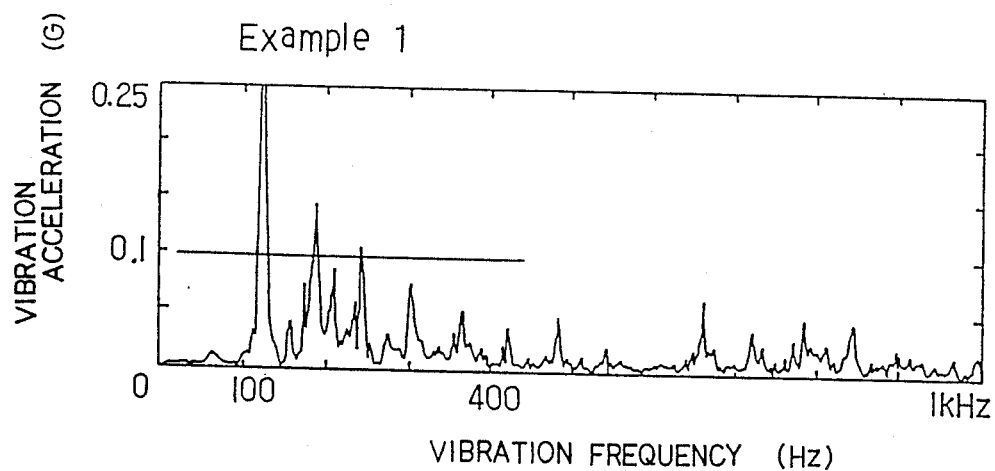
FIGS. 29A and 29B are vibrational spectrum graphs of Example 1 of the control cable system of the present invention.
Figure 29A:
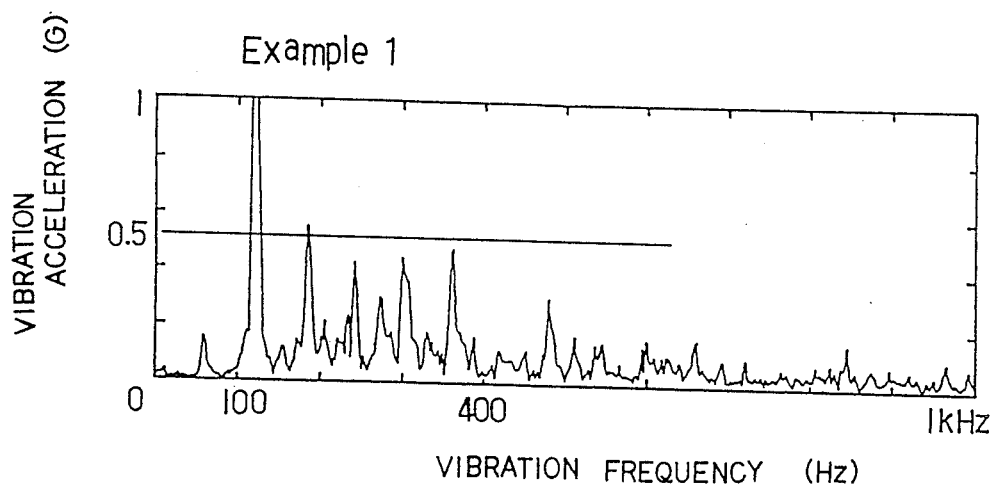
Figure 30B:
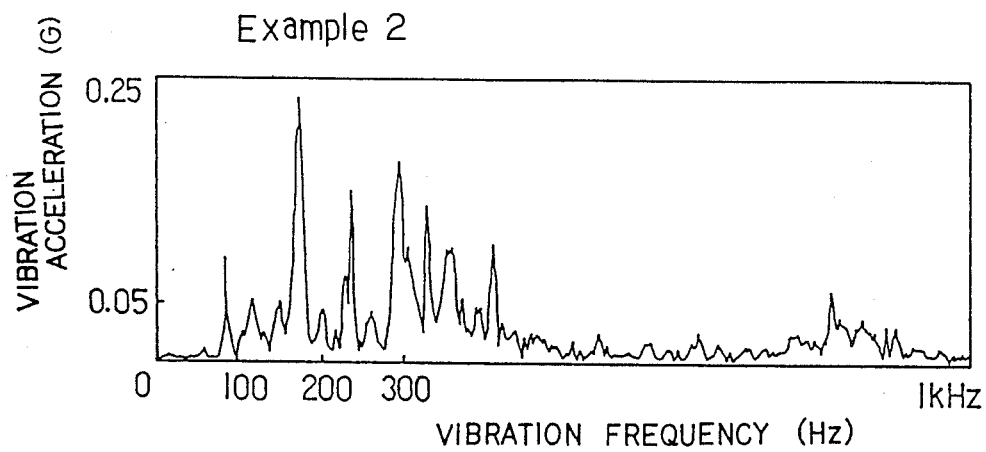
FIGS. 30A and 30B are vibrational spectrum graphs of Example 2 of the control cable system of the present invention.
Figure 30A:
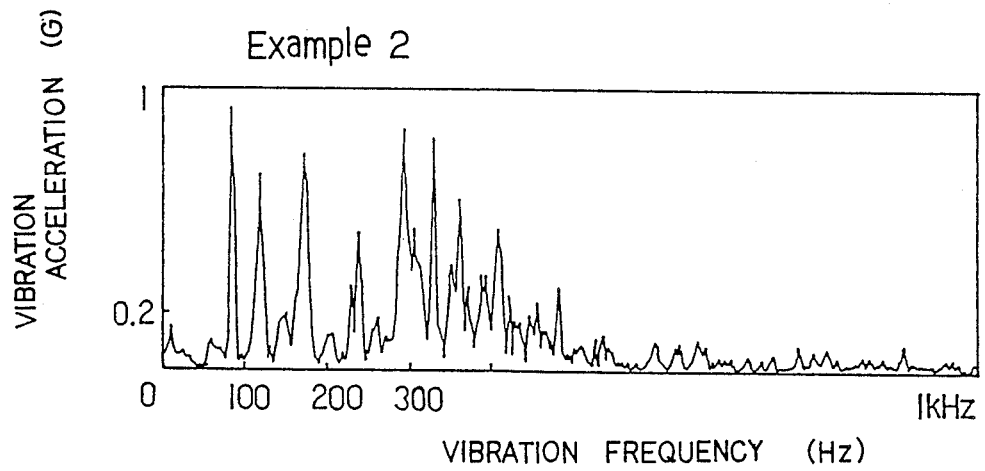
Figure 31B:
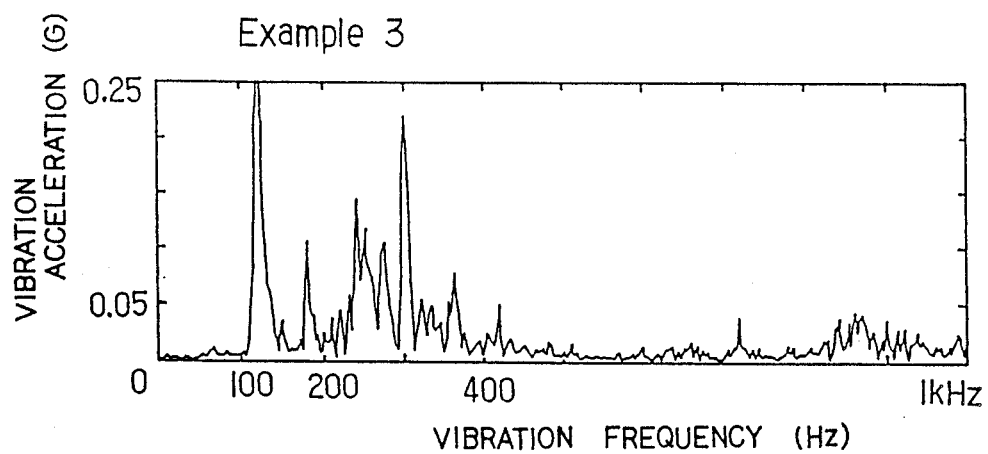
FIGS. 31A and 31B are vibrational spectrum graphs of Example 3 of the control cable system of the present invention.
Figure 31A:
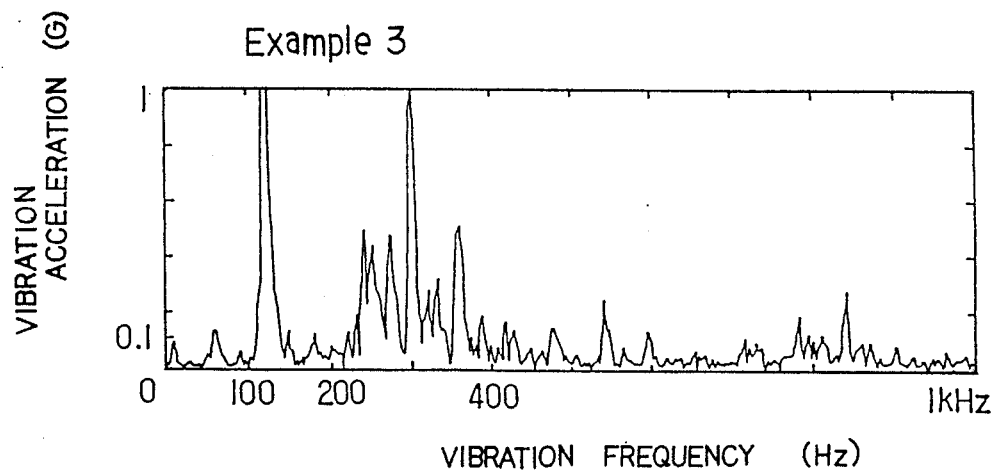

| | Motor Revolution (rpm) | Damper | Measurement Result |
|---|---|---|---|
| Comparative Example | 3500 | None | FIGS. 28A and 28B |
| Example 1 | 3500 | D1 | FIGS. 29A and 29B |
| Example 2 | 3500 | D3 | FIGS. 30A and 30B |
| Example 3 | 3500 | D4 | FIGS. 31A and 31B |

(d) Result:

Results are shown in FIGS. 28A, 28B, 29A, 29B, 30A, 30B, 31A and 31B.

In each of these figures, A is a frequency spectrum of the release lever 7 and B is a frequency spectrum of the dash-panel 6.

FIGS. 28A and 28B show the result concerning Comparative Example wherein no damper is mounted. In other word, the Comparative Example is an original system to which the present invention is applied. From FIGS. 28A and 28B, it can be understood that in case of the motor revolution of 3500 rpm, many vibration peaks (resonance frequencies) not smaller than 0.5 G apear on the release lever 7 when the frequency is within a range from 100 Hz to 400 Hz, and many vibration peaks reaching 1 G also appear. Further, many vibration peaks not smaller than 0.1 G appear on the dash-panel 6 and some vibration peaks reaching 0.25 G also appear.

On the other hand, with respect to Examples 1, 2 and 3 of the first aspect to the present invention wherein the dampers D1, D3 and D4 are mounted respectively, the measurement results are as follows. It should be noted that the experiments concerning Examples 1, 2, 3 and the experiment concerning Comparative Example were conducted under the same condition and they correspond to each other.

In Example 1 (using the damper D1) of which the result is shown in FIGS. 29A and 29B, it can be understood that the vibration acceration at the release lever 7 was almost always lowered to the level not larger than 0.5 G and the vibration acceleration at the dash-panel 6 was almost always lowered to the level not larger than 0.1 G. In addition, although a high vibration peak is shown at about 120 Hz, there is no harm because the frequency is too low to generate confined sound.

In Example 2 (using the damper D3) of which the result is shown in FIGS. 30A and 30B, it can be understood that in the region where the frequency is near 120 Hz or near 220 Hz, the vibration acceleration at the release lever 7 was lowered to the level not larger than 0.2 G and the vibration acceleration at the dash-panel 6 was lowered to the level not larger than 0.05 G. In addition, although a high vibration peak is shown at about 90 Hz, there is also no harm because the frequency is too low to generate confined sound.

Since the damper D3 has two resonance points as mentioned previously, it exhibits vibration damping effect in wide frequency region including the two resonance frequencies. Similarly, since the damper D2 shown in FIG. 8 and the damper D6 shown in FIG. 12 also have each two resonance frequencies, they also exhibit vibration damping effect in wide frequency region.

In Example 3 (using the damper D4) of which the result is shown in FIGS. 31A and 31B, it can be understood that in the region where the frequency is near 150 to 220 Hz, the vibration acceleration at the release lever 7 was lowered to the level not larger than 0.1 G and the vibration acceleration at the dash-panel 6 was also lowered to the level almost not larger than 0.05 G. In addition, although a high vibration peak is shown at about 120 Hz, there is also no harm because the frequency is too low to generate confined sound.

As demonstrated hereinbefore, a control cable system of the first aspect of the present invention to which the damper is applied exhibits a remarkable vibration damping effect compared with a system to which the damper is not applied. Moreover, since no elastic member is inserted in a transmitting route of control force, the operational characteristics are not affected (V) Vibration test (2)

With respect to the cotrol cable system of the second aspect of the present invention, a vibration test was carried out in accordance with the following procedure.

Figure 32:
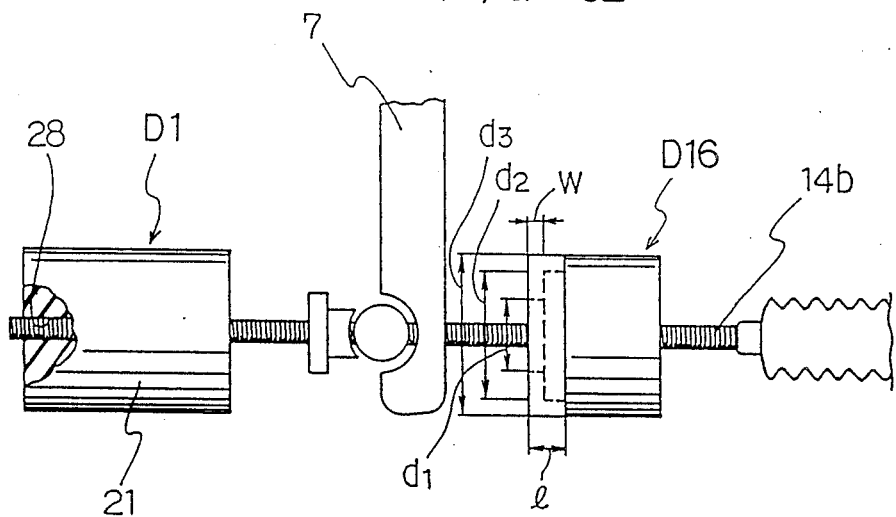
FIG. 32 is a side view showing an example of an attaching manner of a dynamic damper having a weight member when used in the vibration test.
Figure 33:
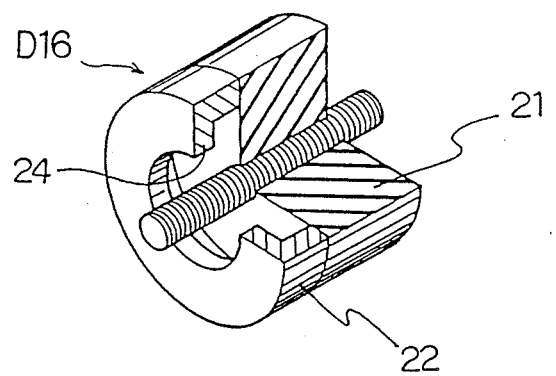
FIG. 33 is a partially cutaway perspective view of the dynamic damper shown in FIG. 32.
Figure 34:
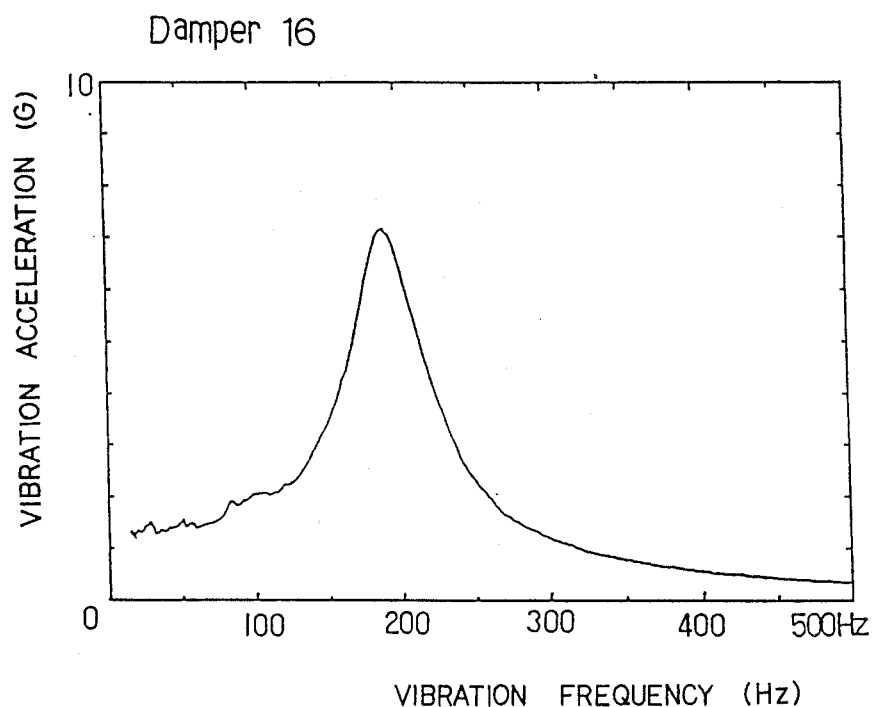
FIG. 34 is a vibrational spectrum graph of the damper D16.

(a) Damper:

The damper D1 shown in FIG. 7 and the damper D16 of the same type as the damper D8 shown in FIG. 14 were subjected to the vibration test The specification of the damper D1 is the same as that of the damper D1 used in the vibration test concerning the first aspect of the present invention In the damper D16, since a weight 22 has L-shape section, it has an inwardly directed flange 24 as shown in FIGS. 32 and 33. With respect to an elastic body 21, the outside diameter is 50 mm, the length is 20 mm, the weight is 57.2 g and the material is chloroprene rubber (hardness JIS A Hs 60). With respect to the weight 22, the inside diameter d1 of the flange 24 is 30 mm, the inside diameter d2 of a body portion is 40 mm, the outside diameter is 50 mm, the thickness w of the flange 24 is 4 mm, the overall thickness l is 10 mm, the material is steel and the weight is 69.0 g. The vibration spectrum thereof is shown in FIG. 34, a resonance frequency exists at 188.75 Hz and the output vibration acceleration corresponding to the input of 1 G at the resonance point is 7 G.

The vibration spectrum of the damper D16 is measured by utilizing the apparatus shown in FIG. 26 in accordance with the same manner as that employed in the foregoing vibration test (1) concerning the first aspect of the present invention.

The damper D16 has resonance frequencies which exist in the range from 100 Hz to 400 Hz including resonance frequencies of the dash panel 6. Further, the resonance frequencies of the damper D1 (348.75 Hz) and the Damper 16 (188.75 Hz) are different from each other (see FIG. 23 and FIG. 34).

(b) Vibration testing apparatus:

The vibration testing apparatus used is the same as the apparatus in FIG. 27 used in the test concerning the first aspect of the present invention excepting that the damper D1 and the damper D16 were mounted to an end fitting 14b on the release lever 7 side of the clutch cable 14 as shown in FIG. 32.

(c) Measuring method:

A motor 1 of the vehicle for the experiment is operated at a specified revolution, pressing and releasing of a clutch pedal 4 are repeated and at the time when confined sound is generated from the instrument panel, the vibration is detected for the subsequent frequency analysis. Conditions of the experiment is as indicated in Table 2.

TABLE 2

Figure 35B:
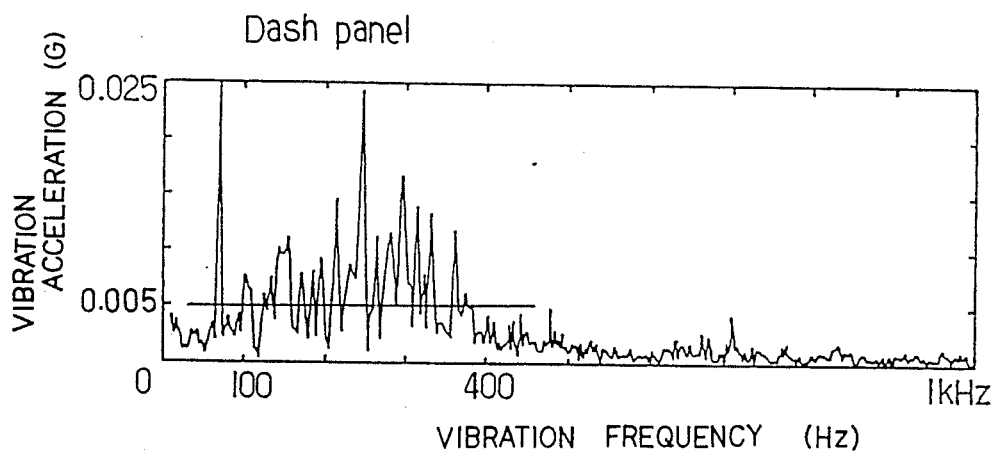
FIGS. 35A and 35B and FIGS. 36A and 36B are vibration spectrum graphs in another condition of the Comparative Example of the control cable system.
Figure 35A:
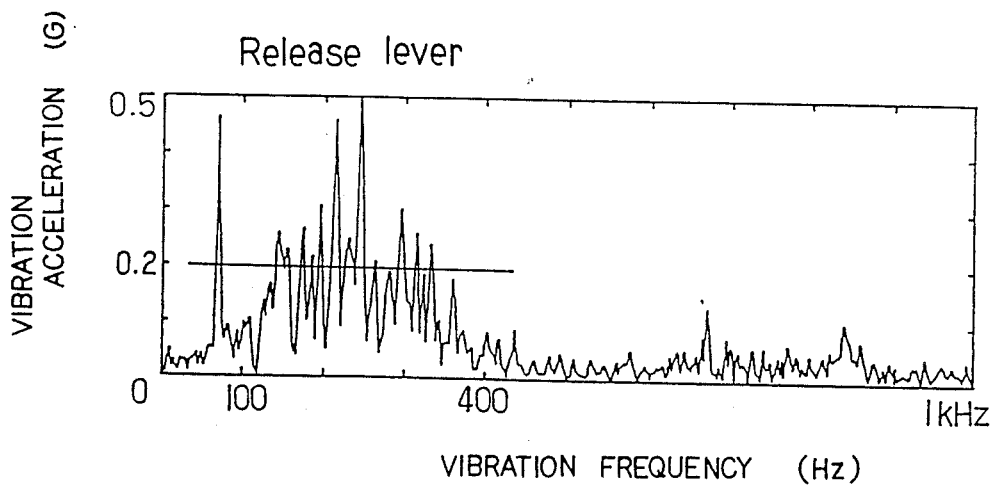
Figure 36B:
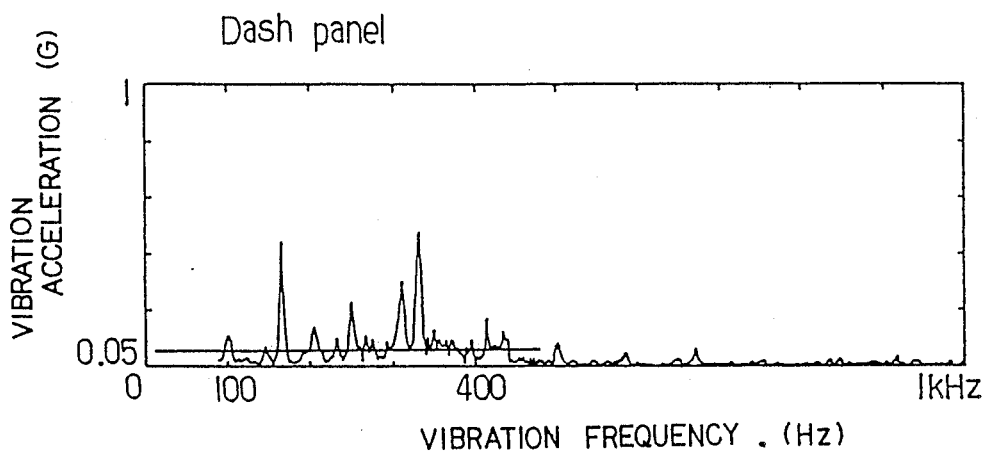
Figure 36A:
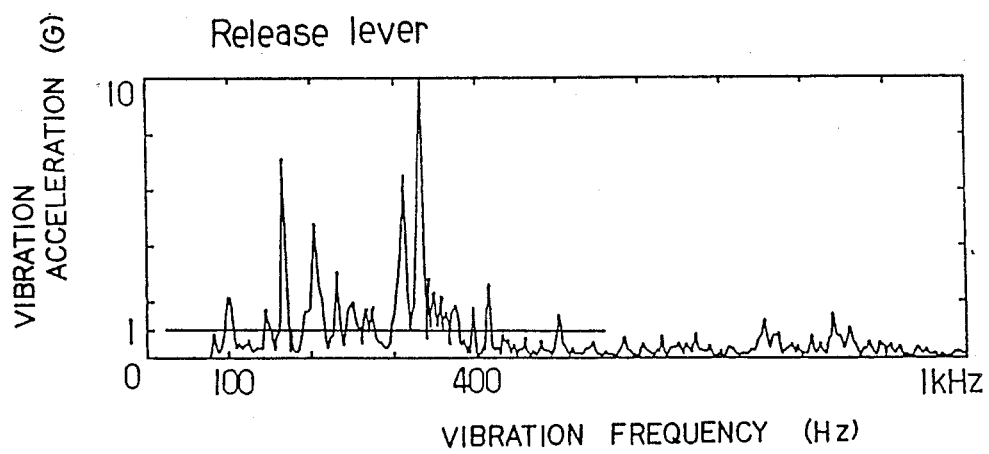
Figure 37B:
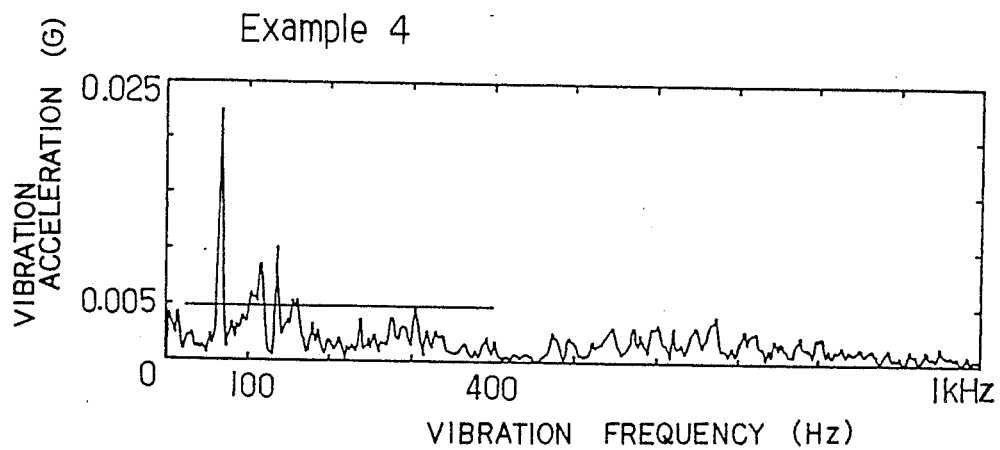
FIGS. 37A and 37B, FIGS. 38B and 38A and FIGS. 39A and 39B are vibration spectrum graphs of Example 4 of the control cable system of the present invention, respectively.
Figure 37A:
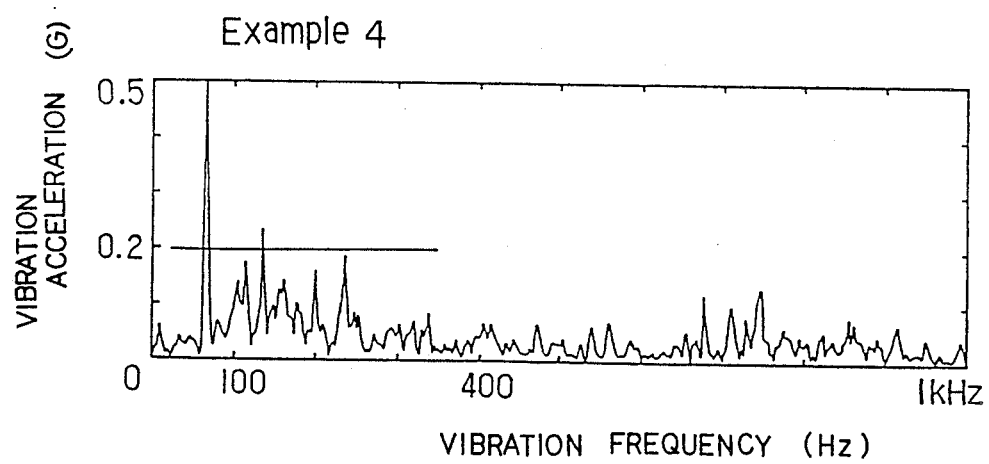
Figure 38B:
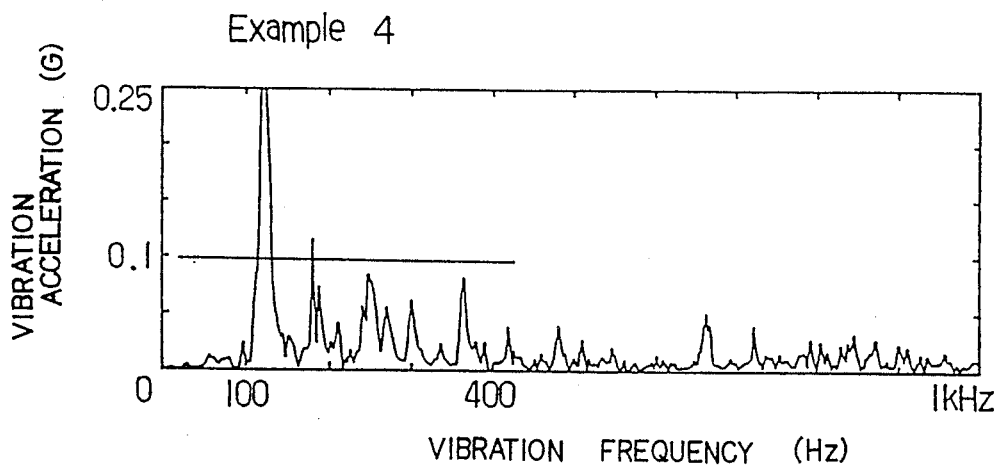
Figure 38A:
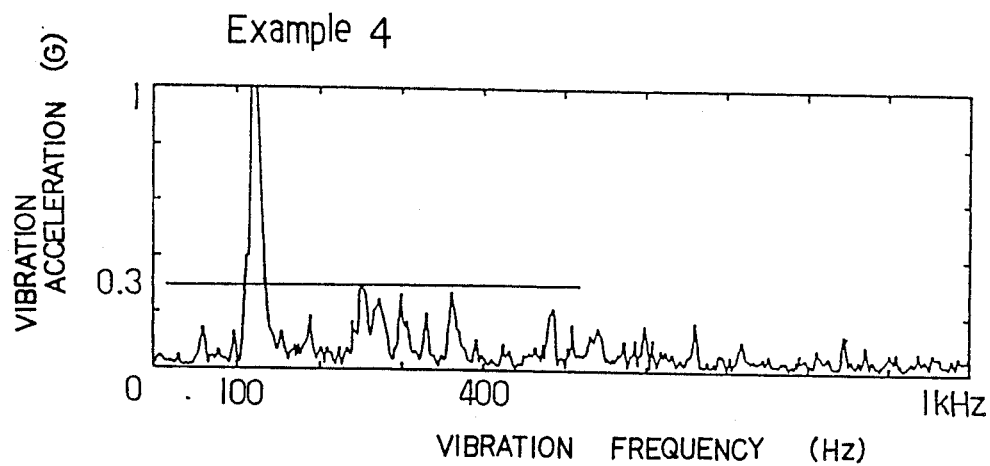
Figure 39B:
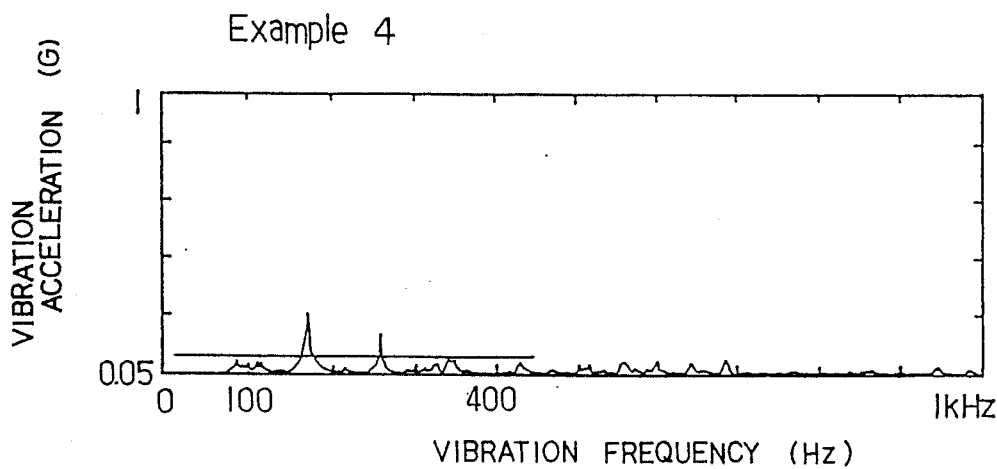
Figure 39A:
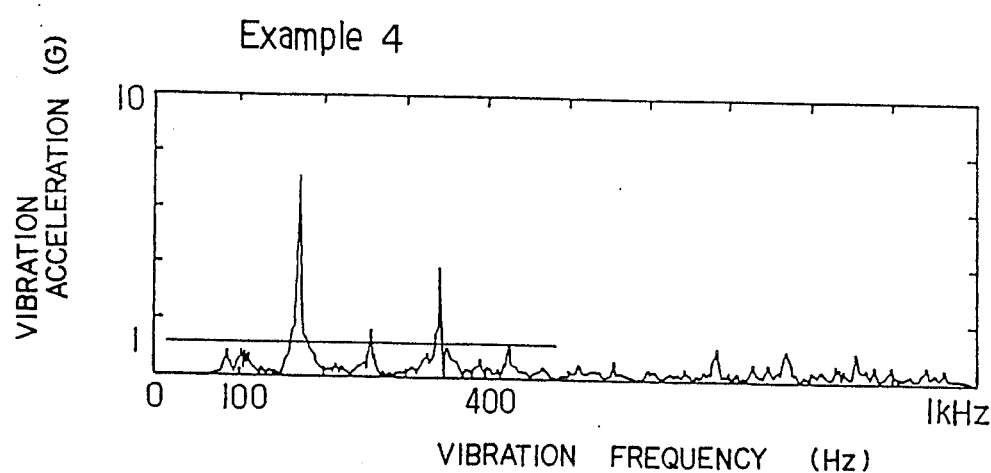
Figure 40B:
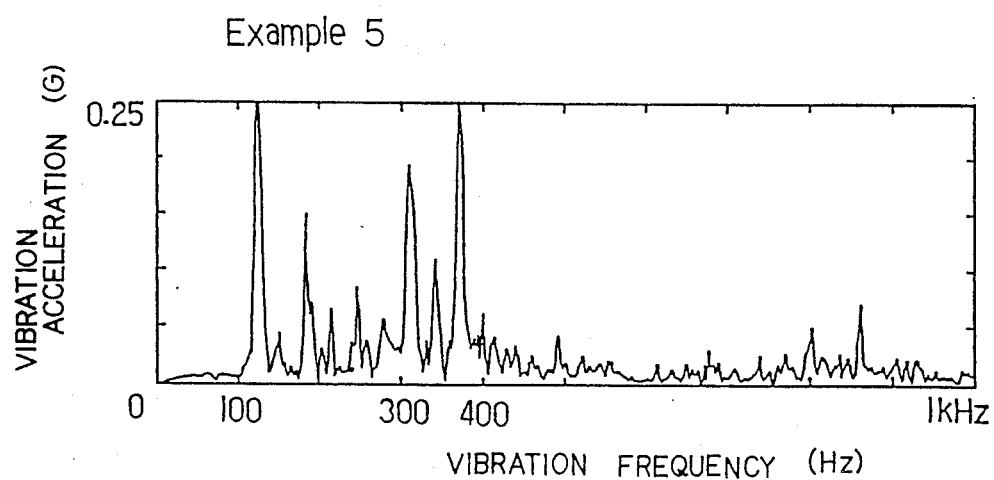
FIGS. 40A and 40B are vibration spectrum graphs of Example 5 of the system of the present invention.
Figure 40A:
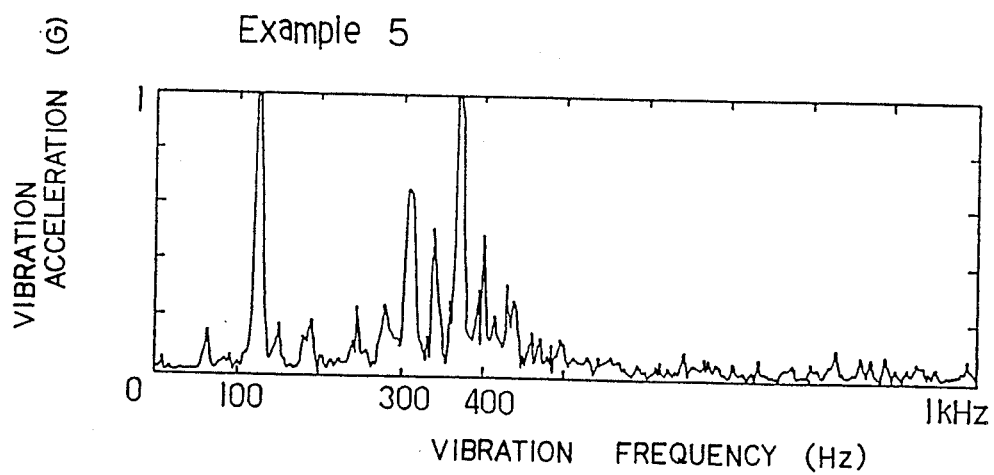
Figure 41:
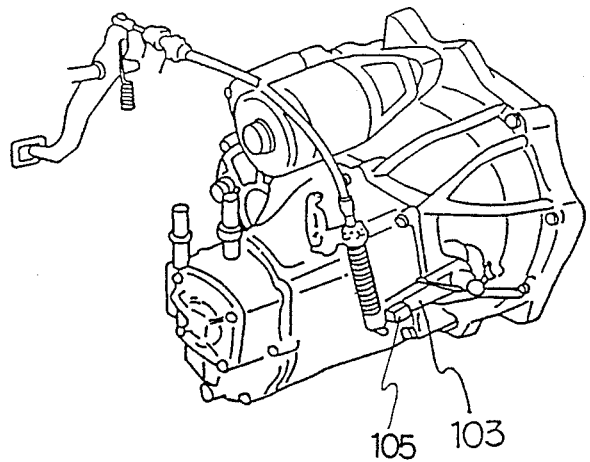
FIGS. 41 and 42 are perspective views showing the system of the prior art I.
Figure 42:
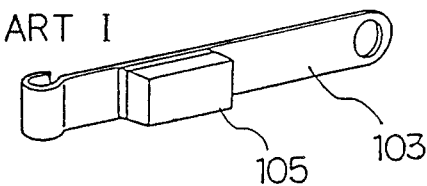
Figure 43:
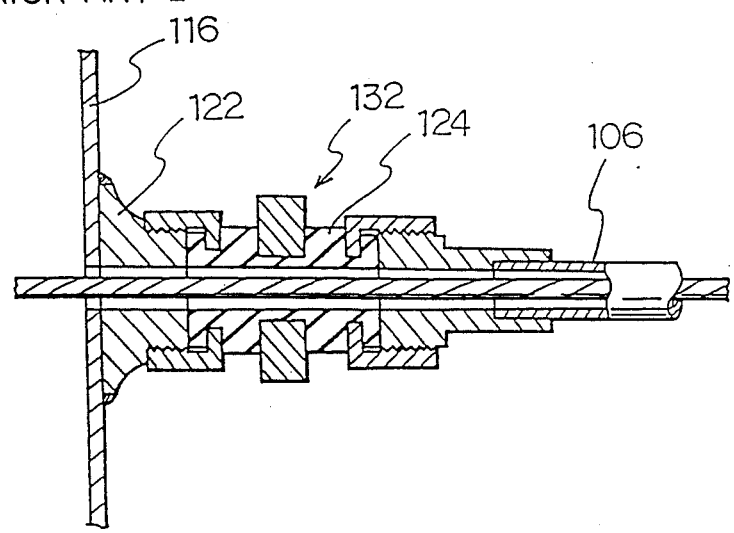
FIG. 43 is a longitudinal sectional view showing a damper of the prior art II.

| | Motor Revolution (rpm) | Damper | Measurement Result |
|---|---|---|---|
| Comparative Example | 2000 | None | FIGS. 35A and 35B |
| | 3500 | None | FIGS. 28A and 28B |
| | 5000 | None | FIGS. 36A and 36B |
| Example 4 | 2000 | D1 + D16 | FIGS. 37A and 37B |
| | 3500 | D1 + D16 | FIGS. 38A and 38B |
| | 5000 | D1 + D16 | FIGS. 39A and 39B |
| Example 5 | 3500 | D16 | FIGS. 40A and 40B |

(d) Result:

Results are shown in FIGS. 28A, 28B, 35A, 35B, 36A, 36B, 37A, 37B, 38A, 38B, 39A, 39B, 40A, 40B, 41A, 41B, 42A and 42B.

In each of these figures, A is a frequency spectrum of the release lever 7 and B is a frequency spectrum of the dash-panel 6.

From FIGS. 35A and 35B it can be understood that in case of the motor revolution of 2000 rpm in the Comparative Example, many vibration peaks not smaller than 0.2 G appear on the release lever 7 when the frequency is within a range from 100 to 400 Hz, and some vibration peaks reaching 0.5 G also appear. Further, it can be understood that many vibration peaks not smaller than 0.005 G appear on the dash-panel 6 and some vibration peaks reaching 0.025 G also appear.

With respect to Comparative Example employing the motor revolution of 3500 rpm, the result was already explained in conjunction with the first aspect of the present invention.

From FIGS. 36A and 36B, it can be understood that in case of the motor revolution of 5000 rpm in the Comparative Example many vibration peaks not smaller than 1 G appear on the release lever 7 when the frequency is within a range from 100 to 400 Hz, and some vibration peaks reaching 10 G also appear. Further, it can be understood that many vibration peaks not smaller than 0.05 G appear on the dash-panel 6 and some vibration peaks larger than 0.4 G also appear.

On the other hand, with respect to Example 4 wherein the damper D1 and the damper D16 are mounted, the measurement results are as follows. It should be noted that the experiments concerning Example 4 and Comparative Example were conductd respectively under the same condition and they respectively correspond to each other.

From FIGS. 37A and 37B, it can be understood that in case of the motor revolution of 2000 rpm the vibration acceleration at the release lever 7 was almost lowered to the level not larger than 0.2 G and the vibration acceleration at the dash-panel 6 was almost always lowered to the level not larger than 0.005 G.

From FIGS. 38A and 38B it can be understood that in case of the motor revolution of 3500 rpm, the vibration acceleration at the release lever 7 was almost always lowered to the level not larger than 0.3 G and the vibration acceleration at the dash-panel 6 was almost always lowered to the level not larger than 0.1 G. In addition, although a high vibration peak is shown at about 150 Hz, there is no harm because the frequency is too low to generate confined sound.

From FIGS. 39A and 39B it can be understood that in case of the motor revolution of 5000 rpm, the vibration acceleration at the release lever 7 was almost always lowered to the level not larger than 1 G and the vibration acceleration at the dash-panel 6 was almost always lowered to the level not larger than 0.05 G. In addition, although a high vibration peak remains high, there is no harm because the frequency is low.

As demonstrated hereinbefore, a control cable system to which the dampers are applied exhibits a remarkable vibration damping effect compared with a system to which the damper is not applied.

Further, comparative experiment was carried out with regard to Example 5 in which only the damper D16 is mounted in a manner illustrated in FIG. 32. That is to say, the Example 5 is included in the first aspect of the present invention. The measurements were carried out at the motor revolution of 3500 rpm.

By seeing the result concerning Example 5 in conjunction with FIGS. 40A and 40B, it is understood that the vibration damping effect in the range from about 150 Hz to about 300 Hz is appreciable but the vibration damping effect in the range from about 300 Hz to about 400 Hz is insufficient. Further, by seeing the result concerning Example 1 in conjunction with FIGS. 29A and 29B, it is understood that the vibration damping effect in the range from about 300 Hz to 400 Hz is appreciable but the vibration damping effect in the range from about 150 Hz to 300 Hz is insufficient in comparison with Example 4. From a comparison between the results shown in FIGS. 40A, 40B, and the vibration spectra of the dampers D1, D16 shown in FIGS. 23, 34, it is understood that the vibration is lowered in the vicinity of each resonance frequency of the dampers D1, D16, but the vibration damping effect cannot be expected in a frequency region apart therefrom.

From the above-mentioned results, it is understood that though the first aspect of the present invention provide a certain effect, further large effect in vibration damping is attained at a frequency in wide range in the second aspect of the present invention wherein two or more dampers whose resonance frequencies are apart from each other are mounted.

Although the foregoing Example 4 employs two dampers, it is a matter of course that if three or more dampers are mounted, a large effect in vibration damping is attained in a wider frequency range.

In accordance with the the present invention, vibration damping for a control cable system can be achieved in a wide frequency range and remarkable, and moreover the operational characteristics of a control cable is not affected at all.

Though several embodiments are described in detail, it is to be understood that the present invention is not limited to the above-mentioned embodiments, and various changes and modifications may be made in the invention without departing from the spirit and scope thereof.

What We claim is:

1. A control cable system with a damper for reducing a vibration comprising:
    a control cable for transmitting a mechanical displacement and which has one end connected to a vibration source and vibrates in an axial direction;
    means locating a vibration member on said control cable and which resonates due to a vibration transmitted by said control cable from said source; and
    dynamic damper means attached to an element of said control cable and located concentrically relative to said control cable, said dynamic damper means vibrating in response to frequencies in a range including a plurality of resonance frequencies of said vibration member and resonating in response to a predetermined one of said resonance frequencies,
    whereby the posture of said dynamic damper means can be easily determined without measurement of direction of vibration since the control cable vibrates in an axial direction and the dynamic damper means does not introduce any stroke-loss to the control cable since the dynamic damper means is located concentrically relative to the control cable and not directly inserted in the operational force transmitting route of the control cable system.

2. The system of claim 1, wherein the dynamic damper comprises a weight and an elastic body.

3. The system of claim 1, wherein the dynamic damper is an elastic body having a weight of itself.

4. The system of claim 1, wherein the dynamic damper comprises a weight and a spring.

5. The system of claim 1, wherein the dynamic damper is a spring.

6. The system of claim 1, wherein the dynamic damper comprises a weight, an elastic body and a spring.

7. The system of claim 1, wherein the dynamic damper is attached to an end of an inner cable of the control cable.

8. The system of claim 1, wherein the dynamic damper is attached on a middle portion of an inner cable of the control cable.

9. The system of claim 1, wherein the dynamic damper is attached on a conduit of the control cable.

10. The system of claim 1, wherein the dynamic damper is attached on a casing cap of the control cable.

11. The system of claim 1, wherein the control cable is connected with a clutch of a vehicle 12. The system of claim 1, wherein the control cable is connected to a manual transmission device of a vehicle.

13. The system of claim 1, wherein the control cable is connected to a device for controlling an automatic transmission device of a vehicle.

14. The system of claim 1, wherein the control cable is connected to an accelerator of a vehicle.

15. The system of claim 1, wherein the control cable is connected to a choke valve of a vehicle.

16. The system of claim 1, wherein the control cable is connected to a speed meter of a vehicle.

17. The system of claim 1, wherein the control cable is a cable for driving a tachometer of a vehicle 18. The system of claim 1, wherein the control cable is connected to a device in a construction machinery.

19. The system of claim 1, wherein the dynamic damper is made in a cylindrical or disk-like form with a center hole axially extending for receiving the element of the control cable and an elastic component of the dynamic damper is deformable in an axial direction so as to vibrate in the direction of the control cable.

20. The system of claim 1, wherein the dynamic damper has two resonance frequencies.

21. A control cable system with a device for reducing a vibration comprising:
a control cable for transmitting a mechanical displacement and which has one end connected to a vibration source and vibrates in an axial direction;
means locating a vibration member on said control cable and which resonates due to a vibration transmitted by said control cable from said source; and
at least two dynamic damper means attached to an element of said control cable and located concentrically relative to said control cable, each of said dynamic damper means vibrating in response to frequencies in a range including a plurality of resonance frequencies of said vibration member and resonating in response to a predetermined one of said resonance frequencies, said resonance frequency of each damper means being different from the resonance frequency of the other damper means;
whereby the posture of each of said dynamic damper means can be easily determined without measurement of direction of vibration since the control cable vibrates in an axial direction and the dynamic damper means do not introduce any stroke-loss to the control cable since the dynamic damper means is located concentrically relative to the control cable and not directly inserted in the operational force transmitting route of the control cable system.

22. The system of claim 21, wherein the dynamic damper is an elastic body having a weight of itself.

23. The system of claim 21, wherein the dynamic damper comprises a weight and a spring.

24. The system of claim 21, wherein the dynamic damper is a spring.

25. The system of claim 21, wherein the dynamic damper is a spring.

26. The system of claim 21, wherein the dynamic damper comprises a weight, an elastic body and a spring.

* * * * *

UNITED STATES PATENT AND TRADEMARK OFFICE
CERTIFICATE OF CORRECTION

PATENT NO. : 4,953,672

DATED : September 4, 1990

INVENTOR(S) : ONIMARU ET AL

It is certified that error appears in the above-identified patent and that said Letters Patent is hereby corrected as shown below:

Column 1, line 41, "86915/1983" should read --86919/1983--.

Signed and Sealed this

Twenty-second Day of June, 1993

Attest:

MICHAEL K. KIRK

Attesting Officer

Acting Commissioner of Patents and Trademarks